US012018588B2

(12) United States Patent
Matsuo et al.

(10) Patent No.: US 12,018,588 B2
(45) Date of Patent: Jun. 25, 2024

(54) STATOR VANE AND GAS TURBINE

(71) Applicant: MITSUBISHI HEAVY INDUSTRIES, LTD., Tokyo (JP)

(72) Inventors: Saki Matsuo, Yokohama (JP); Yusuke Izumi, Yokohama (JP); Satoshi Hada, Yokohama (JP); Takuya Okamoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 26 days.

(21) Appl. No.: 17/796,383

(22) PCT Filed: Nov. 20, 2020

(86) PCT No.: PCT/JP2020/043309
§ 371 (c)(1),
(2) Date: Jul. 29, 2022

(87) PCT Pub. No.: WO2021/186796
PCT Pub. Date: Sep. 23, 2021

(65) Prior Publication Data

US 2023/0340882 A1 Oct. 26, 2023

(30) Foreign Application Priority Data

Mar. 19, 2020 (JP) ................................ 2020-050065

(51) Int. Cl.
*F01D 5/18* (2006.01)
*F01D 9/04* (2006.01)
*F01D 25/24* (2006.01)

(52) U.S. Cl.
CPC ............ *F01D 5/187* (2013.01); *F01D 9/041* (2013.01); *F01D 25/24* (2013.01);
(Continued)

(58) Field of Classification Search
CPC .... F01D 5/187; F01D 9/04–042; F01D 25/24; F05D 2240/126; F05D 2240/81; F05D 2260/201
See application file for complete search history.

(56) References Cited

U.S. PATENT DOCUMENTS 8,137,056 B2 * 3/2012 Fujimoto ............. F01D 25/246 415/173.1
8,651,802 B2 * 2/2014 Bergman ............... F01D 9/041 415/115

(Continued)

FOREIGN PATENT DOCUMENTS

CN 1936273 3/2007
CN 102588013 7/2012

(Continued)

OTHER PUBLICATIONS

International Search Report issued Dec. 28, 2020 in International Application No. PCT/JP2020/043309, with English Translation.

(Continued)

*Primary Examiner* — Sang K Kim
(74) *Attorney, Agent, or Firm* — Wenderoth, Lind & Ponack, L.L.P.

(57) ABSTRACT

This stator vane is at least provided with a blade body disposed in a combustion gas flow channel through which a combustion gas flows, a shroud that defines a part of the combustion gas flow channel, and an impingement plate attached to the shroud. A partition rib extends from a blade body end to an inner wall surface of a peripheral wall, and a shelf is provided at a rib-less part of the inner wall surface of the peripheral wall excluding at least a part in which the partition rib extends to the inner wall surface of the peripheral wall.

16 Claims, 12 Drawing Sheets

(52) U.S. Cl.
CPC .... *F05D 2240/126* (2013.01); *F05D 2240/81* (2013.01); *F05D 2260/201* (2013.01)

(56) References Cited

U.S. PATENT DOCUMENTS

| | | | | |
|---|---|---|---|---|
| 9,903,275 | B2* | 2/2018 | Campomanes | F02C 7/18 |
| 9,988,916 | B2* | 6/2018 | Winn | F01D 9/02 |
| 2007/0128035 | A1 | 6/2007 | Ahmad et al. | |
| 2011/0044805 | A1 | 2/2011 | Koyabu et al. | |
| 2012/0063891 | A1* | 3/2012 | Kruckels | F01D 5/187 415/178 |
| 2012/0177478 | A1 | 7/2012 | Giri et al. | |
| 2014/0056719 | A1 | 2/2014 | Morisaki et al. | |
| 2015/0152736 | A1 | 6/2015 | Liang | |
| 2018/0347369 | A1* | 12/2018 | Sakaguchi | F01D 5/187 |
| 2018/0363499 | A1* | 12/2018 | Smoke | F01D 25/246 |
| 2019/0032499 | A1 | 1/2019 | Matsuo et al. | |
| 2019/0178497 | A1 | 6/2019 | Jones et al. | |

FOREIGN PATENT DOCUMENTS

| | | |
|---|---|---|
| CN | 103628927 | 3/2014 |
| CN | 104675446 | 6/2015 |
| CN | 108291450 | 7/2018 |
| CN | 109441557 | 3/2019 |
| CN | 209726265 | 12/2019 |
| EP | 3361054 | 8/2018 |
| JP | 2008-286157 | 11/2008 |
| JP | 2012-145105 | 8/2012 |
| JP | 5291799 | 9/2013 |
| JP | 2017-96234 | 6/2017 |
| JP | 2017-160892 | 9/2017 |
| WO | 2017/090502 | 6/2017 |

OTHER PUBLICATIONS

Written Opinion of the International Searching Authority issued Dec. 28, 2020 in International Application No. PCT/JP2020/043309, with English Translation.

* cited by examiner

A-A

B-B

C-C

D-D

STATOR VANE AND GAS TURBINE

TECHNICAL FIELD

The present disclosure relates to a stator blade and a gas turbine.

Priority is claimed on Japanese Patent Application No. 2020-050065, filed on Mar. 19, 2020, the content of which is incorporated herein by reference.

BACKGROUND ART

For example, as a stator blade of a gas turbine, there is a stator blade disclosed in PTL 1. The stator blade disclosed in PTL 1 is exposed to a high-temperature combustion gas. Therefore, in PTL 1, an inner shroud or an outer shroud is cooled by being provided with an impingement plate.

CITATION LIST

Patent Literature

[PTL 1] Japanese Unexamined Patent Application Publication No. 2008-286157

SUMMARY OF INVENTION

Technical Problem

In some cases, the stator blade as disclosed in PTL 1 may be designed to have increased rigidity so that the inner shroud or the outer shroud is not distorted due to thermal deformation. However, when the rigidity of the stator blade is increased, there is a possibility that thermal stress partially increases.

The present disclosure is made to solve the above-described problem, and an object of the present invention is to provide a stator blade and a gas turbine which can suppress thermal stress generation.

Solution to Problem

According to the present disclosure, in order to solve the above-described problem, there is provided a stator blade including at least a blade body disposed in a combustion gas flow path through which a combustion gas flows, and a shroud that defines a part of the combustion gas flow path. The shroud includes a shroud body including at least a bottom plate having a gas pass surface facing the combustion gas flow path, and an inner surface facing a counter-flow path side opposite to the gas pass surface, and an impingement plate attached to the shroud body and having a plurality of through-holes. The shroud body is formed to include the bottom plate, a peripheral wall protruding toward the counter-flow path side from a peripheral edge of the inner surface of the shroud body, a shelf formed along an inner wall surface of the peripheral wall, protruding to the counter-flow path side from the inner surface of the bottom plate, and supporting the impingement plate, and at least one or more partition ribs protruding to the counter-flow path side from the bottom plate, and joining the blade body and the peripheral wall on which the shelf is not formed. The impingement plate forms a cavity which is a space between the inner surface of the bottom plate and the inner wall surface of the peripheral wall.

Advantageous Effects of Invention

According to the stator blade of the present disclosure, thermal stress generation can be suppressed.

DESCRIPTION OF EMBODIMENTS

Embodiments

Hereinafter, embodiments of the present disclosure will be described with reference to the drawings.

<<Configuration of Gas Turbine>>

Figure 1:
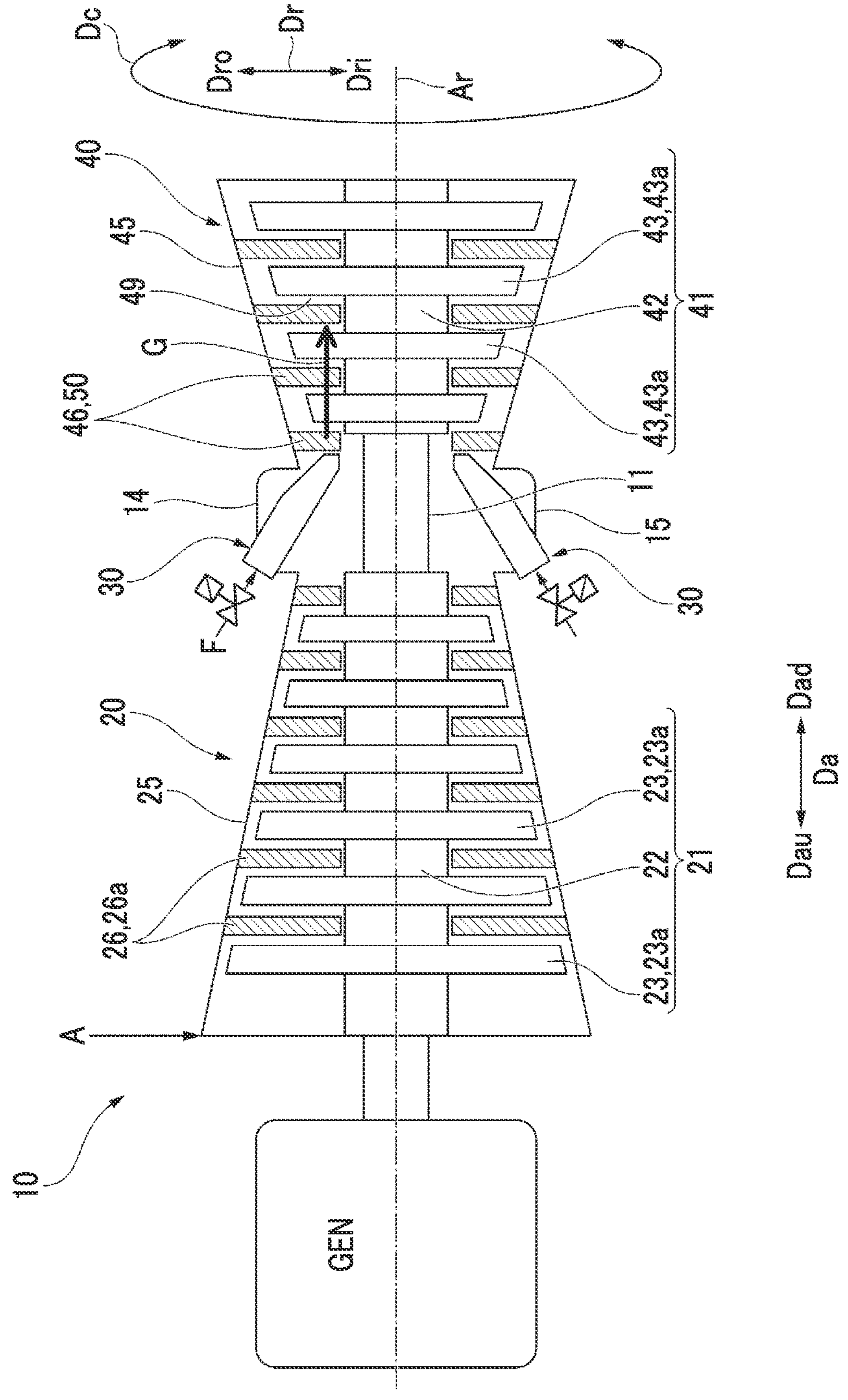
FIG. 1 is a schematic sectional view of a gas turbine according to an embodiment of the present disclosure.

As illustrated in FIG. 1, a gas turbine 10 of the present embodiment includes a compressor 20 that compresses air A, a combustor 30 that combusts a fuel F in the air A compressed by the compressor 20 to generate a combustion gas, and a turbine 40 driven by the combustion gas.

The compressor 20 includes a compressor rotor 21 that rotates around an axis Ar, a compressor casing 25 that covers the compressor rotor 21, and a plurality of stator blade rows 26. The turbine 40 includes a turbine rotor 41 that rotates around the axis Ar, a turbine casing 45 that covers the turbine rotor 41, and a plurality of stator blade rows 46.

The compressor rotor 21 and the turbine rotor 41 are located on the same axis Ar, and are connected to each other to form a gas turbine rotor 11. For example, a rotor of a generator GEN is connected to the gas turbine rotor 11. The gas turbine 10 further includes an intermediate casing 14 disposed between the compressor casing 25 and the turbine casing 45. The compressor casing 25, the intermediate casing 14, and the turbine casing 45 are connected to each other to form a gas turbine casing 15. Hereinafter, an extending direction of the axis Ar will be referred to as an axial direction Da, a circumferential direction around the axis Ar will be simply referred to as a circumferential direction Dc, and a direction perpendicular to the axis Ar will be referred to as a radial direction Dr. In addition, the compressor 20 side with reference to the turbine 40 in the axial direction Da will be referred to as an upstream side Dau, and a side opposite thereto will be referred to as a downstream side Dad. In addition, a side closer to the axis Ar in the radial direction Dr will be referred to as a radial inner side Dri, and a side opposite thereto will be referred to as a radial outer side Dro.

The compressor rotor 21 includes a rotor shaft 22 extending in the axial direction Da around the axis Ar, and a plurality of rotor blade rows 23 attached to the rotor shaft 22. The plurality of rotor blade rows 23 are disposed side by side along the axial direction Da. Each of the rotor blade rows 23 is configured to include a plurality of rotor blades 23*a* disposed side by side along the circumferential direction Dc. A stator blade row 26 is disposed on each upstream side Dau of the plurality of rotor blade rows 23. Each stator blade row 26 is provided inside the compressor casing 25. Each of the stator blade rows 26 is configured to include a plurality of stator blades 26*a* disposed side by side along the circumferential direction Dc.

The turbine rotor 41 includes a rotor shaft 42 extending in the axial direction Da around the axis Ar, and a plurality of rotor blade rows 43 attached to the rotor shaft 42. The plurality of rotor blade rows 43 are disposed side by side along the axial direction Da. Each of the rotor blade rows 43 is configured to include a plurality of rotor blades 43*a* disposed side by side along the circumferential direction Dc. A stator blade row 46 is disposed on each upstream side Dau of the plurality of rotor blade rows 43. Each stator blade row 46 is provided inside the turbine casing 45. Each of the stator blade rows 46 is configured to include a plurality of stator blades 50 disposed side by side along the circumferential direction Dc.

Figure 2:
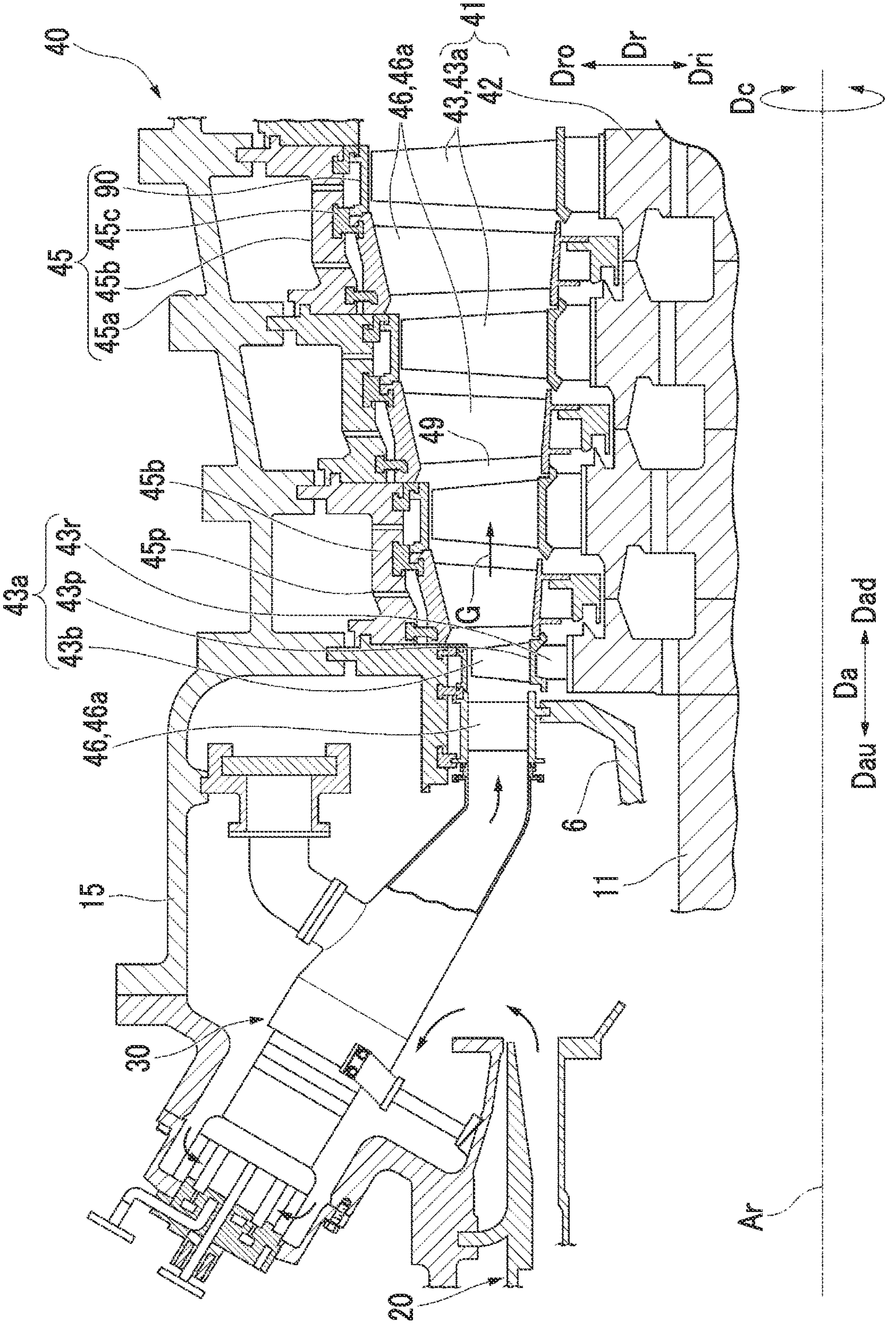
FIG. 2 is a sectional view of a main part of the gas turbine according to the embodiment of the present disclosure.

As illustrated in FIG. 2, the turbine casing 45 includes a tubular outer casing 45*a* forming an outer shell thereof, an inner casing 45*b* fixed to the inside of the outer casing 45*a*, a plurality of split rings 90 fixed to the inside of the inner casing 45*b*, and a thermal barrier ring 45*c* that connects the stator blade 50 and the split ring 90 to the inner casing 45*b*. Each of the plurality of split rings 90 is provided at a position between the plurality of stator blade rows 46. Therefore, the rotor blade row 43 is disposed on the radial inner side Dri of each of the split rings 90.

An annular space between the rotor shaft 42 and the turbine casing 45 in the radial direction Dr where the stator blade 50 and the rotor blade 43*a* are disposed in the axial direction Da forms a combustion gas flow path 49 through which a combustion gas G from the combustor 30 flows. The combustion gas flow path 49 forms an annular shape around the axis Ar, and is long in the axial direction Da. A cooling air passage 45*p* penetrating the radial inner side Dri from the radial outer side Dro is formed in the inner casing 45*b* of the turbine casing 45. Cooling air passing through the cooling air passage 45*p* is introduced into the stator blade 50 and the split ring 90, and is used for cooling the stator blade 50 and the split ring 90.

<<Configuration of Turbine Stator Blade>>

Figure 3:
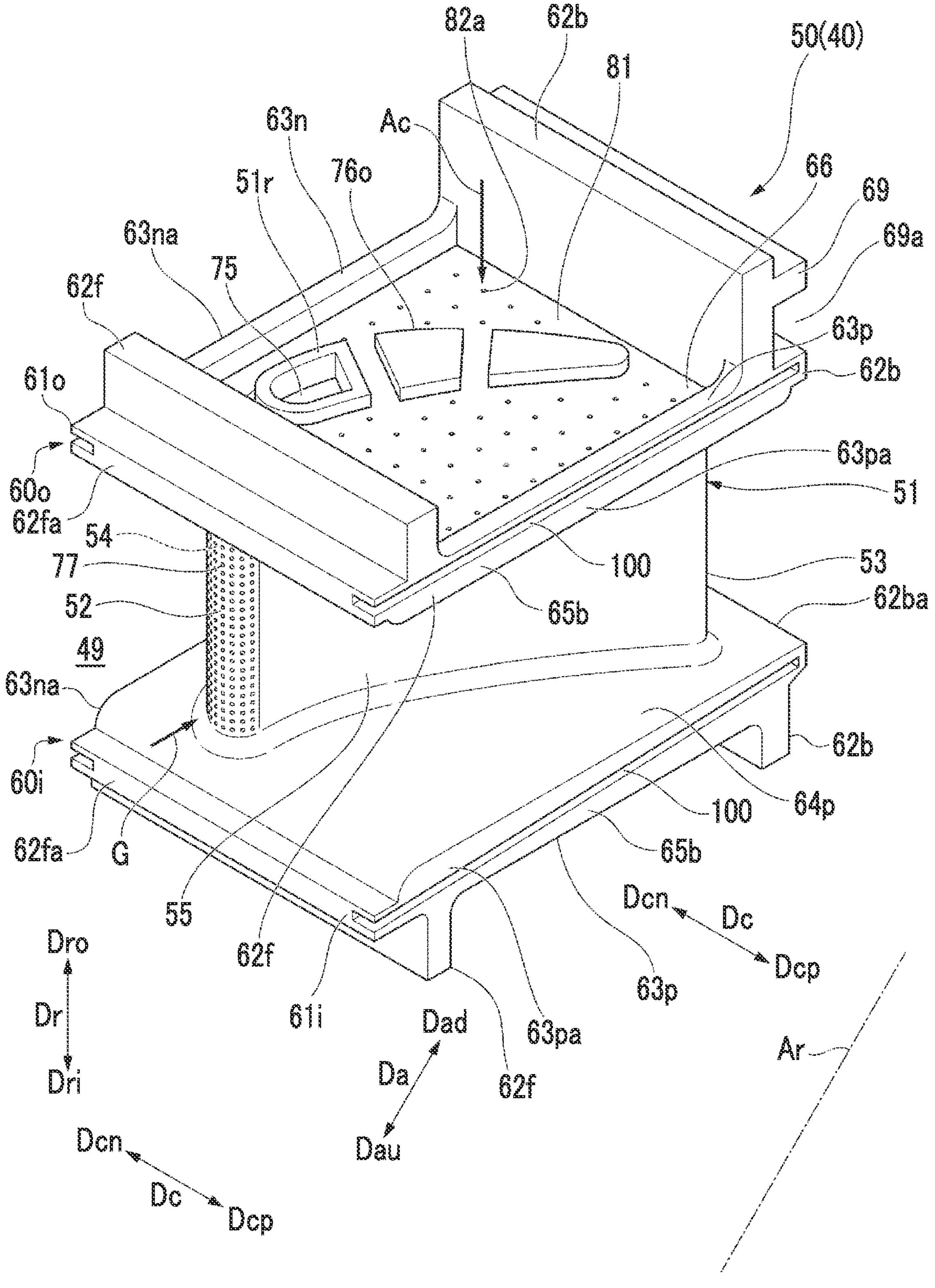
FIG. 3 is a perspective view of a stator blade when the stator blade according to the embodiment of the present disclosure is viewed from a radial outer side.

As illustrated in FIG. 3, the stator blade 50 of the turbine 40 includes a blade body 51 extending in the radial direction Dr, an inner shroud 60*i* formed on the radial inner side Dri of the blade body 51, and an outer shroud 60*o* formed on the radial outer side Dro of the blade body 51. The blade body 51 is disposed inside the combustion gas flow path 49 through which the combustion gas G passes. The inner shroud 60*i* defines a position on the radial inner side Dri in the annular combustion gas flow path 49. The outer shroud 60*o* defines a position on the radial outer side Dro in the annular combustion gas flow path 49.

A hook 69 for supporting the stator blade 50 in the gas turbine casing 15 (outer casing 45*a* and inner casing 45*b*) is provided on a side closer to a trailing edge portion 53 of the blade body 51 in the outer shroud 60*o* or the stator blade 50. The hook 69 of the stator blade 50 is provided on a rear peripheral wall 62*b* of the outer shroud 60*o*. The hook 69 of the stator blade 50 is fitted to the thermal barrier ring 45*c* supported by the inner casing 45*b*. In this way, the stator blade 50 is supported by the gas turbine casing 15 via the thermal barrier ring 45*c*.

Figure 4:
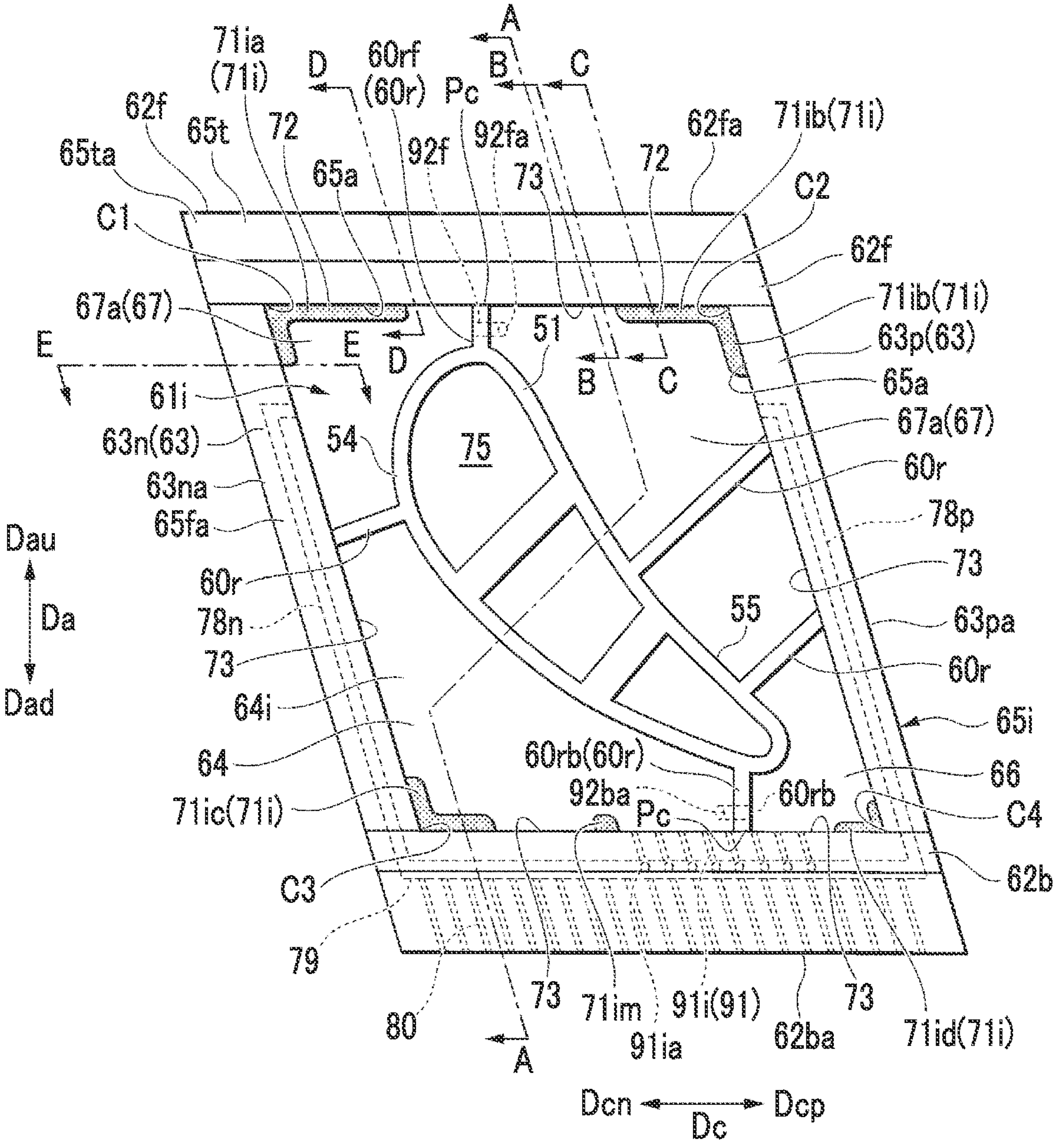
FIG. 4 is a view when an inner shroud in FIG. 3 is viewed from a radial inner side.
Figure 5:
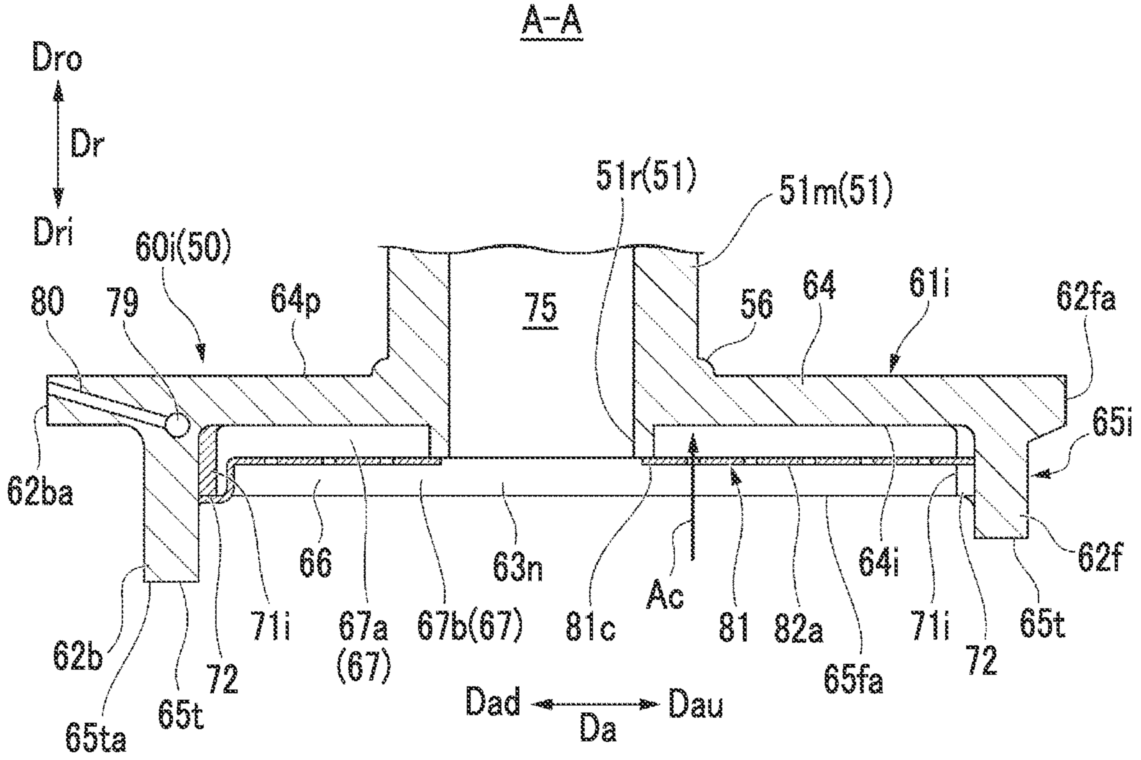
FIG. 5 is a sectional view taken along line A-A in FIG. 4.

As illustrated in FIGS. 3 to 5, the blade body 51 has a blade shape. The blade body 51 extends in the radial direction Dr, is connected to the inner shroud 60*i* on the radial inner side Dri, and is connected to the outer shroud 60*o* on the radial outer side Dro. The blade body 51 is integrated with the inner shroud 60*i* and the outer shroud 60*o* to form the stator blade 50. Each of blade body end portions 51*r* on the radial inner side Dri and the radial outer side Dro of the blade body 51 slightly protrudes to the radial inner side Dri and the radial outer side Dro from an inner surface 64*i* of a bottom plate 64 of the inner shroud 60*i* and the outer shroud 60*o*. In FIG. 4, an impingement plate 81 is omitted in the illustration.

The blade body 51 includes a leading edge portion 52 on the upstream side Dau and a trailing edge portion 53 on the downstream side Dad. The blade body 51 further includes suction side surface 54 (=negative pressure surface) forming a projecting surface and a pressure-side surface 55 (=positive pressure surface) forming a recessed surface, out of surfaces facing the circumferential direction Dc of the surface of the blade body 51. For convenience of the following description, a pressure-side (=positive pressure surface side) of the blade body 51 in the circumferential direction Dc will be referred to as a circumferential pressure-side Dcp, and a suction-side (=negative pressure surface side) of the blade body 51 will be referred to as a circumferential auction-side Dcn. In addition, the upstream side Dau in the axial direction Da may be referred to as a front side, and the downstream side Dad in the axial direction Da may be referred to as a rear side.

As illustrated in FIGS. 3 and 5, the blade body 51 includes a blade air passage 75 extending in the radial direction Dr. The blade air passage 75 is continuously formed in a range from the outer shroud 60*o* to the inner shroud 60*i*. In the present embodiment, a case is illustrated where three blade air passages 75 are disposed side by side along a leading edge-trailing edge direction connecting the leading edge portion 52 and the trailing edge portion 53 of the blade body 51. The blade air passages 75 adjacent to each other may communicate with each other in a portion on the radial outer side Dro or in a portion on the radial inner side Dri. In addition, any one of a plurality of blade air passages 75 may be open on the radial outer side Dro. In the present embodiment, a case is illustrated where the blade air passage 75 closest to the leading edge portion 52 is open on the outer shroud 60*o* side (refer to FIG. 3).

As illustrated in FIGS. 3 and 5, the blade body end portion 51*r* is formed by forming the blade body 51 in both end portions on the radial inner side Dri and the radial outer side Dro. Specifically, in the blade body 51, the blade body end portion 51*r* formed on the radial inner side Dri protrudes to the radial inner side Dri which is the counter-flow path side from the inner surface 64*i* (refer to FIGS. 4 and 5) of the inner shroud body 61*i*. The blade body end portion 51*r* (refer to FIG. 3) on the radial outer side Dro protrudes to the radial outer side Dro which is the counter-flow path side from the inner surface 64*i* of the outer shroud body 61*o*. An outer shape cross section of the blade body end portion 51*r* formed on the radial inner side Dri when viewed from the radial inner side Dri and an outer shape cross section when the blade body end portion 51*r* formed on the radial outer side Dro is viewed from the radial outer side Dro respectively form blade shapes. The blade body end portion 51*r* is formed integrally with the blade body 51.

<<Configuration of Inner Shroud>>

As illustrated in FIGS. 3 to 5, the inner shroud 60*i* is configured to include an inner shroud body (shroud body) 61*i* and an impingement plate 81 (to be described later) accommodated inside the inner shroud body 61*i* and having a plurality of through-holes.

The inner shroud body 61*i* is configured to include a bottom plate 64 forming the inner surface 64*i* of the above-described inner shroud body 61*i*, a peripheral wall 65*i* disposed around the bottom plate 64, a partition rib 60*r* (to be described later) that partitions a space (cavity 67) inside the inner shroud body 61*i*, and a shelf 71*i* that supports the impingement plate 81. The peripheral wall 65*i* includes a front peripheral wall 62*f* and a rear peripheral wall 62*b* which face each other in the axial direction Da, and a pressure-side peripheral wall 63*p* and a suction-side peripheral wall 63*n* which face each other in the circumferential direction Dc, and the peripheral wall 65*i* is disposed around the bottom plate 64, thereby forming the inner shroud body 61*i*. A recessed portion 66 recessed to the radial outer side Dro from the counter-flow path side is formed inside the inner shroud body 61*i*. An end surface on the upstream side Dau of the front peripheral wall 62*f* forms a front end surface 62*fa*, and an end surface on the downstream side Dad forms a rear end surface 62*ba*. Out of a pair of end surfaces facing opposite sides in the circumferential direction Dc, an end surface of the pressure-side peripheral wall 63*p* located on the circumferential pressure-side Dcp forms a pressure-side end surface 63*pa*, and an end surface on the suction-side peripheral wall 63*n* located on the circumferential suction-side Dcn forms a suction-side end surface 63*na*. In addition, the bottom plate 64 of the inner shroud body 61*i* includes a gas pass surface 64*p* facing the radial outer side Dro and an inner surface (counter-flow path surface) 64*i* facing the radial inner side Dri which is the counter-flow path side opposite to the gas pass surface 64*p*.

In the inner shroud 60*i* described as an example in the present embodiment, the front peripheral wall 62*f* and the rear peripheral wall 62*b* are substantially parallel to each other, and the pressure-side peripheral wall 63*p* and the suction-side peripheral wall 63*n* are substantially parallel to each other. Therefore, when viewed in the radial direction Dr, the inner shroud body 61*i* has a parallel quadrilateral shape.

The pressure-side peripheral wall 63*p* of the inner shroud 60*i* of one stator blade 50 of the two stator blades 53 (not illustrated) adjacent to each other in the circumferential direction Dc is disposed to face the suction-side peripheral wall 63*n* of the inner shroud 60*i* of the other stator blade 50 with a gap in the circumferential direction Dc.

As described above, the peripheral wall 65*i* includes the front peripheral wall 62*f* and the rear peripheral wall 62*b* which face each other in the axial direction Da, and the pressure-side peripheral wall 63*p* and the suction-side peripheral wall 63*n* which face each other in the circumferential direction Dc.

The pressure-side peripheral wall 63*p* forms a portion of the peripheral wall 65*i* which is located on the circumferential pressure-side Dcp, and the suction-side peripheral wall 63*n* forms a portion of the peripheral wall 65*i* which is located on the circumferential suction-side Dcn.

Both the front peripheral wall 62*f* and the rear peripheral wall 62*b* protrude to the radial inner side Dri from the pressure-side peripheral wall 63*p* and the suction-side peripheral wall 63*n* with respect to the inner shroud body 61*i*.

<<Configuration of Partition Rib of Inner Shroud>>

A plurality of partition ribs 60*r* are formed in the inner shroud 60*i*. The partition rib 60*r* protrudes to the radial inner side Dri from the inner surface 64*i* of the inner shroud body.

The partition rib 60*r* joins the blade body end portion 51*r* of the blade body 51 and the inner wall surface 65*a* of the peripheral wall 65*i* of the inner shroud 60*i*. Five partition ribs 60*r* are formed in the inner shroud 60*i* of the present embodiment. The blade body 51, the inner shroud body 61*i*, the outer shroud body 61*o*, and the partition rib 60*r* are integrally formed by means of casting. As a result, a space (cavity 67) which is the recessed portion 66 of the inner shroud 60*i* forms the cavity 67 partitioned into a plurality of spaces in such a manner that the recessed portion 66 is partitioned by disposing the plurality of partition ribs 60*r* between the blade body end portion 51*r* and the peripheral wall 65*i*. In addition, a height from the inner surface 64*i* of the inner shroud 60*i* of the blade body end portion 51*r* which is an end portion outside and inside in the radial direction Dr of the blade body 51 is the same height as the partition rib 60*r*. However, the height may be changed depending on a shape of the shroud.

In the present embodiment, each one of the partition ribs 60*r* is provided between the leading edge portion 52 on the most upstream side Dau of the blade body end portion 51*r* and the inner wall surface 65*a* of the front peripheral wall 62*f* of the peripheral wall 65*i*, between the trailing edge portion 53 or the most downstream side Dad of the blade body end portion 51*r* and the inner wall surface 65*a* of the rear peripheral wall 62*b* of the peripheral wall 65*i*, and between the blade body end portion 51*r* on the suction-side surface 54 side and the inner wall surface 65*a* of the suction-side peripheral wall 63*n* of the peripheral wall 65*i*. In addition, two partition ribs 60*r* are provided at an interval in the axial direction Da between the blade body end portion 51*r* of the pressure-side surface 55 and the inner wall surface 65*a* of the pressure-side peripheral wall 63*p* of the peripheral wall 65*i*. The number and disposition of the partition ribs 60*r* formed in the inner shroud 60*i* are examples, and are not limited to the above-described configuration. The plurality of partition ribs 60*r* for joining the blade body end portion 51*r* and the peripheral wall 65*i* are disposed in the recessed portion 66 inside the inner shroud 60*i*. In this manner, the recessed portion 66 is partitioned into the plurality of spaces to form a plurality of the cavities 67. The cavity 67 is partitioned into a plurality of cavities. In this manner, the cooling air can be held for each of the cavities 67 independently of each other under different conditions.

As illustrated in FIG. 4, one end of the partition rib 60*r* is connected to the blade body end portion 51*r* of the blade body 51, and the other end of the partition rib 60*r* is connected to the inner wall surface 65*a* of the peripheral wall 65*i*. That is, the tip of the partition rib 60*r* from each of the blade body end portions 51*r* of the leading edge portion. 52, the trailing edge portion. 53, the suction-side surface 54, and the pressure-side surface 55 of the blade body 51 extends to the inner wall surface 65a of the peripheral wall 65i.

<<Concept of Thermal Stress Generated in Shroud %>

As one of the embodiments according to the present invention, in some cases, a structure for partially forming the shelf 71 (71i, 71o) may be applied along the inner wall surface 65a of the peripheral wall 65 (65i, 65o) of the shroud 60 (60i, 60o) instead of the entire periphery of the peripheral wall 65. Significance of a shroud structure which can reduce local thermal stress of the shroud 60 while suppressing thermal strain or thermal deformation of the whole shroud 60 will be described below.

In general, as means for cooling the shroud 60, the impingement plate 81 is disposed inside the shroud 60, the cooling air is supplied to the shroud 60 from the outside, and the inner surface of the shroud 60 is subjected to impingement cooling (collision cooling). On the other hand, as means for improving the impingement cooling of the shroud 60, in some cases, the plurality of partition ribs 60r may be formed inside the shroud 60, the cavity 67 inside the shroud 60 may be divided into the plurality of cavities, and conditions of the cooling air supplied to each of the cavities 67 may be changed to perform optimum impingement cooling on the shroud 60. In this case, a structure for individually fixing the impingement plate 81 to each of the plurality of divided cavities 67 by means of welding may be adopted. In some cases, the thermal strain or the thermal deformation may occur in the shroud 60 due to a heat input caused by welding heat when the impingement plate 81 is welded and fixed. In order to suppress occurrence of the thermal strain or the thermal deformation of the shroud 60, the shelf 71 can be formed along the inner wall surface 65a of the peripheral wall 65 to increase rigidity of the shroud 60. In this manner, the thermal strain or the thermal deformation of the shroud 60 can be suppressed.

On the other hand, although the rigidity of the shroud 6C is increased by disposing the shelf 71 along the inner wall surface 65a of the peripheral wall 65, in some cases, the thermal stress may locally increase depending on the structure of the shroud 60. For example, as illustrated in FIGS. 2 and 3, when the outer shroud 60o is described as an example, the stator blade 50 is supported by the gas turbine casing 15 via the hook 69 and the thermal barrier ring 45c which are formed in the outer shroud 60c. When the gas turbine 10 enters a normal operation, a temperature difference occurs between the stator blade 50 and the gas turbine casing 15 that supports the stator blade 50, and a thermal elongation difference in the circumferential direction Dc occurs in a fitting portion 69a between the hook 69 and the thermal barrier ring 45c. That is, due to the heat input from the combustion gas side, in the outer shroud 60o, deformation in which the suction-side end surface 63na side and the pressure-side end surface 63pa side warp in a direction of the radial outer side Dro occurs around a center line in the leading edge-trailing edge direction (in FIG. 10, a line parallel to the suction-side end surface 63na or the pressure-side end surface 63pa, which is a center line in the circumferential direction Dc of the outer shroud 60o and a line connecting an intermediate position in the circumferential direction Dc of the front end surface 62fa and an intermediate position in the circumferential direction Dc of the rear end surface 62ba). However, the thermal barrier ring 45c side fitted to the hook 69 is maintained at a relatively low temperature, and the thermal deformation is small. Accordingly, the deformation on the hook 69 side is restricted by the fitting portion 69a between the hook 69 and the thermal barrier ring 45c. Due to the restriction of the fitting portion 69a, the thermal stress is generated between the suction-side end surface 63na and the pressure-side end surface 63pa in the circumferential direction of the rear peripheral wall 62b of the outer shroud 60o.

On the other hand, due to the thermal elongation difference between the blade body 51 and the rear peripheral wall 62b and the front peripheral wall 62f which are connected via the partition ribs 60r (first partition rib 60rf, second partition rib 60rb), in some cases, high thermal stress may be generated in the rear peripheral wall 62b and the front peripheral wall 62f. That is, in the blade body 51, the thermal elongation of the blade body 51 is suppressed to be relatively small by the cooling air supplied to the blade air passage 75. On the other hand, the rear peripheral wall 62b and the front peripheral wall 62f tend to suffer thermal elongation in the circumferential direction Dc due to the heat input from the combustion gas. Therefore, the rear peripheral wall 62b and the front peripheral wall 62f receive the restriction from the partition rib 60r (first partition rib 60rf, second partition rib 60rb) that joins the leading edge portion 52 side and the trailing edge portion 53 side of the blade body 51 to the peripheral wall 65. In this manner, in some cases, the high thermal stress may be generated in a predetermined region of the peripheral walls 65i and 65o around a joining portion joined to the partition rib 60r (first partition rib 60rf, second partition rib 60rb) on the rear peripheral wall 62b and the front peripheral wall 62f. Therefore, in order to reduce the thermal stress, a trailing edge end portion passage 80 and a trailing edge purge cooling hole 91 (to be described later) are disposed in the inner shroud 60i and the outer shroud 60o.

The above-described concept of the thermal stress is a concept mainly applied to the outer shroud 60o. In a case of the inner shroud 60i, as described above, the inner shroud 60i is less affected by the thermal stress generated due to the restriction of the fitting portion 69a between the hook 69 of the outer shroud 60o and the thermal barrier ring 45c.

In a case of the inner shroud 60i, compared to the outer shroud 60o, the structure does not receive the restriction from the outside due to the thermal elongation difference. As described above, the structure is limited to a case where the high thermal stress is generated in the rear peripheral wall 62b and the front peripheral wall 62f due to the thermal elongation difference between the blade body 51 and the rear peripheral wall 62b and the front peripheral wall 62f which are connected via the partition rib 60r (first partition rib 60rf, second partition rib 60rb). However, the inner shroud 60i is less affected by the thermal stress, compared to the outer shroud 60c. Therefore, a range for disposing the trailing edge purge cooling hole 91 is limited.

<<Range for Disposing Shelf of Inner Shroud>>

As illustrated in FIG. 4, the peripheral wall 65i of the inner shroud 60i has four corners, a first corner C1, a second corner C2, a third corner C3, and a fourth corner C4 on the inner wall surface 65a. The first corner C1 is formed by the inner wall surface 65a of the suction-side peripheral wall 63n and by the inner wall surface 65a of the front peripheral wall 62f. The second corner C2 is formed by the inner wall surface 65a of the pressure-side peripheral wall 63p and by the inner wall surface 65a of the front peripheral wall 62f. The third corner C3 is formed by the inner wall surface 65a of the suction-side peripheral wall 63n and by the inner wall surface 65a of the front peripheral wall 62f. The fourth corner C4 is formed by the inner wall surface 65a of the pressure-side peripheral wall 63p and by the inner wall surface 65a of the rear peripheral wall 62b. In the inner shroud 60i in the present embodiment, the shelves 71i are formed in the first corner C1, the second corner C2, the third corner C3, and the fourth corner C4.

As illustrated in FIG. 4, in a case of the inner shroud 60*i*, a plurality of trailing edge end portion passages 80 (to be described later) are arrayed over the entire width from the suction-side end surface 63*na* to the pressure-side end surface 63*pa* on the rear peripheral wall 62*b* disposed on the trailing edge portion 53 side of the inner shroud 60*i*. Furthermore, in order to partially improve the cooling on the gas pass surface side of the rear peripheral wall 62*b* in which the trailing edge circumferential passage 79 of the rear peripheral wall 62*b* is disposed, a plurality of arrayed trailing edge purge cooling holes 91 (first purge cooling holes 91*i*) are disposed in a predetermined range in the circumferential direction Dc while the partition rib 60*r* (second partition rib 60*rb*) that joins the trailing edge portion 53 of the blade body 51 and the rear peripheral wall 62*b* is interposed therebetween.

Meanwhile, as described above, the rear peripheral wall 62*b* and the front peripheral wall 62*f* tend to be elongated in the circumferential direction Dc due to the heat input from the combustion gas. However, the thermal elongation is restricted by the partition ribs 60*r* (first partition rib 60*rf*, second partition rib 60*rb*) that join the blade body end portion 51*r* of the blade body 51 and the inner wall surface 65*a* of the rear peripheral wall 62*b* and of the front peripheral wall 62*f*. The high thermal stress partially acts on the rear peripheral wall 62*b* and the front peripheral wall 62*f* in the circumferential direction Dc around a joining portion joined to the partition ribs 60*r* (first partition rib 60*rf*, second partition rib 60*rb*).

Therefore, as illustrated in FIG. 4, in a case of the rear peripheral wall 62*b*, on the inner wall surface 65*a* of the rear peripheral wall 62*b*, a shelf 71*ic* including the third corner C3 and extending to the circumferential pressure-side Dcp, and a shelf 71*id* including the fourth corner C4 and extending to the circumferential suction-side Dcn are disposed. Between the shelf 71*ic* and the shelf 71*id*, a region 73 that does not form the shelves is disposed on both sides in the circumferential direction Dc while the partition rib 60*r* (second partition rib 60*rb*), an intermediate shelf 71*im* (71*i*), and an intermediate shelf 71*im* (71*i*) are interposed therebetween. A position where the partition rib 60*r* (second partition rib 60*rb*) is connected to the peripheral wall 65*i* is disposed within a range where the trailing edge purge cooling hole 91 (first purge cooling hole 91*i*) (to be described later) formed on the rear peripheral wall 62*b* is formed in the circumferential direction Dc. In a case of the rear peripheral wall 62*b*, the thermal stress increases the most in the vicinity of a position Pc where the partition rib 60*r* (second partition rib 60*rb*) is joined to the peripheral wall 65*i*. The thermal stress gradually decreases from the position Pc toward the circumferential suction-side Dcn and the circumferential pressure-side Dcp. The shelves 71*ic* (71*i*) and 71*id* (71*i*) are formed in a range from a position where the thermal stress is equal to or smaller than an allowable value from the position Pc toward the circumferential suction-side Dcn to the third corner C3 and in a range from the position to the fourth corner C4 toward the circumferential pressure-side Dcp.

The intermediate shelf 71*im* disposed between the position Pc of the second partition rib 60*rb* and the shelf 71*ic* (71*i*) has the same width and the same height as those of the shelf 71*ic* (71*i*). The length in the circumferential direction Dc is substantially the same as the width of the shelf, and the intermediate shelf 71*im* has a substantially rectangular cross section. The intermediate shelf 71*im* (71*i*) has a small cross-sectional shape, and serves as the shelf for receiving the impingement plate 81. That is, in the region 73 where the shelf is not formed between the position Pc of the second partition rib 60*rb* and the shelf 71*ic* (71*i*) on the third corner C3 side, the intermediate shelf 71*im* (71*i*) is provided for positioning in the radial direction Dr when the impingement plate 81 is fixed to the inner wall surface 65*a* of the rear peripheral wall 62*b*. The thermal stress generated on the rear peripheral wall 62*b* is hardly affected by the presence or absence of the intermediate shelf 71*im* (71*i*). The intermediate shelf 71*im* (711) is formed integrally with the shelf 71*ic* (71*i*) and the shelf 71*id* (71*i*) during the casting of the blade body 51. When positioning in the radial direction Dr can be separately performed by using a jig, the intermediate shelf 71*im* (71*i*) may not be provided.

As illustrated in FIG. 4, the position Pc of the second partition rib 60*rb* in the circumferential direction Dc is an intermediate position in the circumferential direction Dc of the width from the suction-side end surface 63*na* to the pressure-side end surface 63*pa* of the inner shroud body 61*i*, and is close to the pressure-side end surface 63*pa* side. The length of the region 73 where the shelf 71 is not formed from the position Pc of the second partition rib 60*rb* to an end portion of the circumferential pressure-side Dcp of the shelf 71*ic* (71*i*) is longer than the length of the region 73 where the shelf 71 is not formed from the position Pc to an end portion of the circumferential suction-side Dcn of the shelf 71*id* (71*i*). The reason is as follows. The suction-side end surface 63*na* side is more affected by the thermal stress than the pressure-side end surface 63*pa* side in the circumferential direction Dc around the second partition rib 60*rb*. The position in the circumferential direction Dc of the intermediate shelf 71*im* (71*i*) is disposed closer to the circumferential suction-side Dcn than the position of the first purge cooling hole 91*i* closest to the suction-side end surface 63*na* of the first purge cooling holes 91*i*.

The region where the shelf 71 is not formed between the shelf 71*ic* (71*i*) and the shelf 71*id* (71*i*) is disposed on both sides in the circumferential direction Dc while the second partition rib 60*rb* is interposed therebetween. In this manner, the thermal stress generated in the rear peripheral wall 62*b* is reduced.

In a case of the front peripheral wall 62*f*, the concept of the thermal stress acting on the front peripheral wall 62*f* is the same as that of the rear peripheral wall 62*b*. However, since the heat input from the combustion gas is small, there is less thermal stress generated on the front peripheral wall 62*f*. A case of the front peripheral wall 62*f* does not include a cooling structure such as the trailing edge end portion passage 80 and the trailing edge purge cooling hole 91. Similar to the rear peripheral wall 62*b*, a shelf 71*ia* including the first corner C1 and extending to the circumferential pressure-side Dcp and a shelf 71*ib* including the second corner C2 and extending to the circumferential suction-side Dcn are disposed on the inner wall surface 65*a* of the front peripheral wall 62*f*. The region 73 where the shelf 71 is not formed is provided between the shelf 71*ia* and the shelf 71*ib*, and the first partition rib 60*rf* interposed from both sides in the circumferential direction Dc is disposed in the region.

The thermal stress generated on the front peripheral wall 62*f* is reduced by disposing the region where the shelves 71 are not formed on both sides in the circumferential direction Dc while the first partition rib 60*rf* is interposed therebetween.

The region 73 where the shelf 71 is not formed (portion having no shelf) extends to the suction-side peripheral wall 63*n* and the pressure-side peripheral wall 63*p*, except for some shelves extending in the axial direction Da (leading edge-trailing edge direction) from the first corner C1, the second corner C2, the third corner C3, and the fourth corner C4 which are end portions of the shelf 71*ic* disposed on the rear peripheral wall 62*b*, the shelf 71*id*, the shelf 71*ia* disposed on the front peripheral wall 62*f*, and the shelf 71*ib*. In addition, the reason that the shelf 71 is not disposed along the inner wall surface 65*a* of the suction-side peripheral wall 63*n* and of the pressure-side peripheral wall 63*p* is as follows. Compared to the front peripheral wall 62*f* and the rear peripheral wall 62*b*, the thermal strain or the thermal deformation caused by welding heat of the impingement plate 81 is relatively smaller.

<<Configuration Around Shelf of Inner Shroud>>

As illustrated in FIGS. 4 and 5, the shelf 71 for supporting the impingement plate is provided in the inner shroud 60*i*. The shelf 71 protrudes to the radial inner side Dri from the inner surface 64*i* of the bottom plate 64 of the inner shroud body 61*i* along the inner wall surface 65*a* of the peripheral wall 65*i*. That is, the shelf 71 protrudes to the counter-flow path side on a side opposite to the gas pass surface 64*p* (combustion gas flow path side) in the radial direction Dr with reference to the inner surface 64*i* of the bottom plate 64 of the inner shroud body 61*i*. The shelf 71 has a support surface 72 facing the radial inner side Dri side which is the counter-flow path side with respect to the gas pass surface 64*p* on the flow path side, and supports the impingement plate 81.

As illustrated in FIG. 5, the support surface 72 is located on a side closer to the inner surface 64*i* of the bottom plate 64 of the inner shroud body 61*i* than an end portion 65*t* of the peripheral wall 65*i* in the radial direction Dr. In addition, the support surface 72 of the shelf 71 is located on the radial inner side Dri in the radial direction Dr from the end portion of the partition rib 60*r* described above. In other words, the height of the shelf 71 with reference to the inner surface 64*i* of the inner shroud body 61*i* in the radial direction Dr is lower than the height of the peripheral wall 65*i* with reference to the same inner surface 64*i*. In addition, in the present embodiment, the thickness of the shelf 71*i* in a direction protruding inward from the inner wall surface 65*a* of the peripheral wall 65*i* is thinner than the thickness of the peripheral wall 65*i* in the same direction as the direction of the thickness of the shelf 71.

As illustrated in FIG. 5, a surface 65*fa* (FIG. 9) facing the radial inner side Dri of the suction-side peripheral wall 63*n* and the pressure-side peripheral wall 63*p* is formed closer to the inner surface 64*i* of the bottom plate 64 than the position of a surface 65*ta* facing the radial inner side Dri of the end portion 65*t* of the front peripheral wall 62*f* and of the rear peripheral wall 62*b*, and is formed at substantially the same height as the position of the support surface 72 of the shelf 71.

<<Configuration of Impingement Plate of Inner Shroud>>

The impingement plate 81 illustrated in FIG. 5 is attached to the inner shroud 60*i*. The impingement plate 81 partitions the space (cavity 67) inside the recessed portion. 66 of the inner shroud 60*i* into an outer cavity 67*b* in a region on the radial inner side Dri and into an inner cavity 67*a* in a region on the radial outer side Dro. A plurality of through-holes 82*a* penetrating in the radial direction Dr are formed in the impingement plate 31. A portion of cooling air Ac existing on the radial inner side Dri of the stator blade 50 flows into the inner cavity 67*a* via the through-hole 82*a* of the impingement plate 81, and performs impingement cooling (collision cooling) on the bottom plate 64 of the inner shroud 60*i*.

As illustrated in FIGS. 6 to 9, the impingement plate 81 includes a main body portion 82 including the plurality of through-holes 82*a*, a strain absorber 83 that absorbs the thermal strain of the main body portion 82, and a fixing portion 84 that fixes the main body portion 82 to the shroud 60.

As described above, the main body portion 82 is a member including the plurality of through-holes 82*a* and extending parallel to the inner surface 64*i* of the bottom plate 64 of the inner shroud body 61*i* to the inner wall surface 65*a* of the peripheral wall 65*i*.

Figure 6:
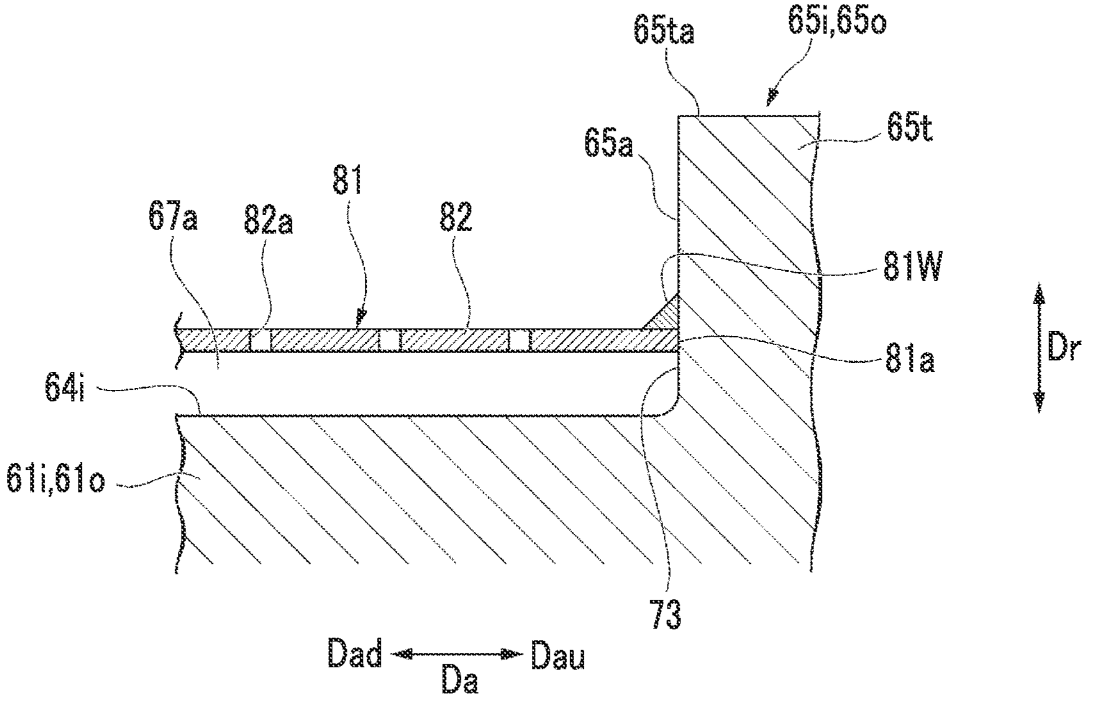
FIG. 6 is a sectional view illustrating a cross section taken along line B-B in FIG. 4.

FIG. 6 is a sectional view illustrating a cross section taken along line B-B in FIG. 4. The embodiment illustrated in FIG. 6 has a structure in which the main body portion 82 extends in the axial direction Da (leading edge-trailing edge direction) while maintaining the same height parallel to the inner surface 64*i* of the bottom plate 64. An aspect is adopted as follows. A first edge 81*a* which is an end surface of the main body portion 82 abuts against and is fixed to the inner wall surface 65*a* of the region 73 where the shelf 271 is not provided on the inner wall surface 65*a* of the peripheral wall 65*i*. The first edge 81*a* which is an abutting end surface with respect to the inner wall surface 65*a* of the peripheral wall 65*i* is joined to the inner wall surface 65*a* of the peripheral wall 65*i* via a welding portion 81W formed by fillet welding.

Figure 7:
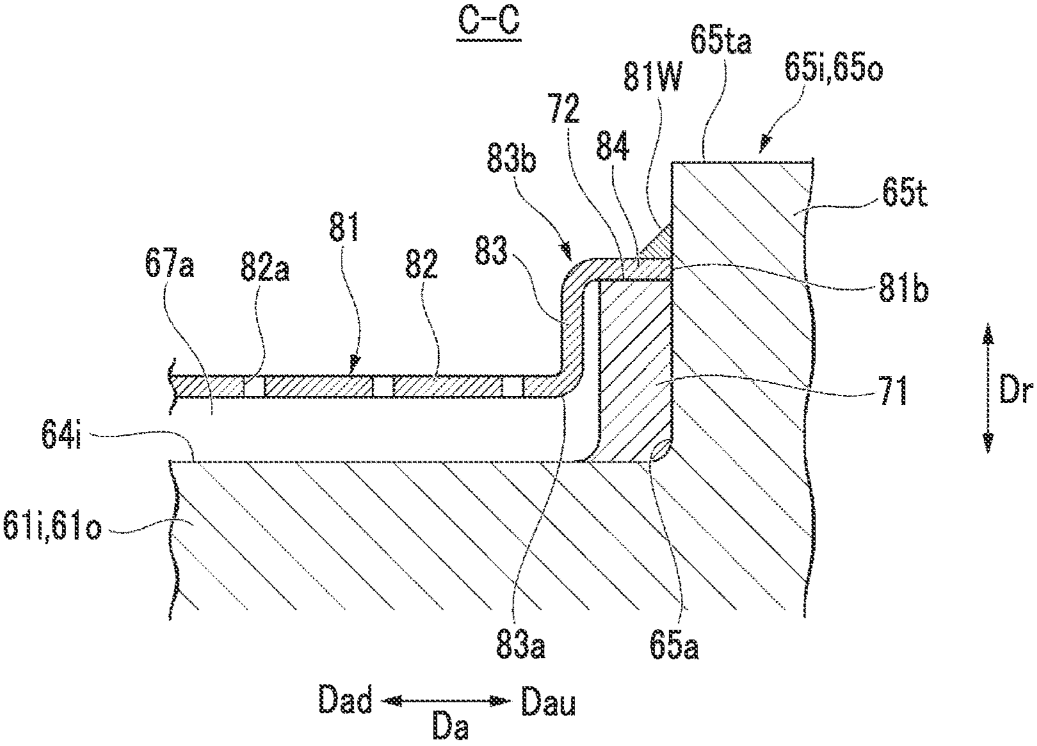
FIG. 7 is a sectional view illustrating a cross section taken along line C-C in FIG. 4.

FIG. 7 is a sectional view illustrating a cross section taken along line C-C in FIG. 4. The embodiment illustrated in FIG. 7 indicates an attachment structure of the impingement plate 81 in a region where the shelf 71 is formed on the inner wall surface 65*a* of the peripheral wall 65*i*.

In the present embodiment, an aspect includes a structure in which the shelf 71 (71*i*) is disposed between the main body portion 82 and the inner wall surface 65*a* of the peripheral wall 65*i*, and the strain absorber 83 extending in the radial direction Dr and the fixing portion 84 are disposed in the impingement plate 81. The strain absorber 83 is a member bent with a predetermined inclination with respect to the axial direction Da in which the main body portion 82 extends, and extends in the radial direction Dr. The strain absorber 83 is connected to the main body portion 82 via a first bent portion 83*a* on the radial inner side Dri, and is connected to the fixing portion 84 (to be described later) via a second bent portion 83*b* on the radial outer side Dro.

The fixing portion 84 is connected to the second bent portion 83*b* of the strain absorber 83, and extends in the axial direction Da (leading edge-trailing edge direction). That is, the strain absorber 83 in the present embodiment extends in a vertical direction intersecting both the main body portion 82 and the fixing portion 84. The strain absorber 83 is disposed to be separated by a predetermined distance or longer from the shelf 71 to which the fixing portion 84 of the impingement plate 81 is fixed and the inner wall surface 65*a* of the peripheral wall 65*i*. In this manner, even when the main body portion 82 of the impingement plate 81 is thermally elongated in the axial direction Da and the circumferential direction Dc, the thermal elongation of the main body portion 82 is absorbed by the deformation of the strain absorber 83. Therefore, the thermal stress acting on the welding portion 81W of the second edge 81*b* which is an end surface of the impingement plate 81 is reduced.

Figure 8:
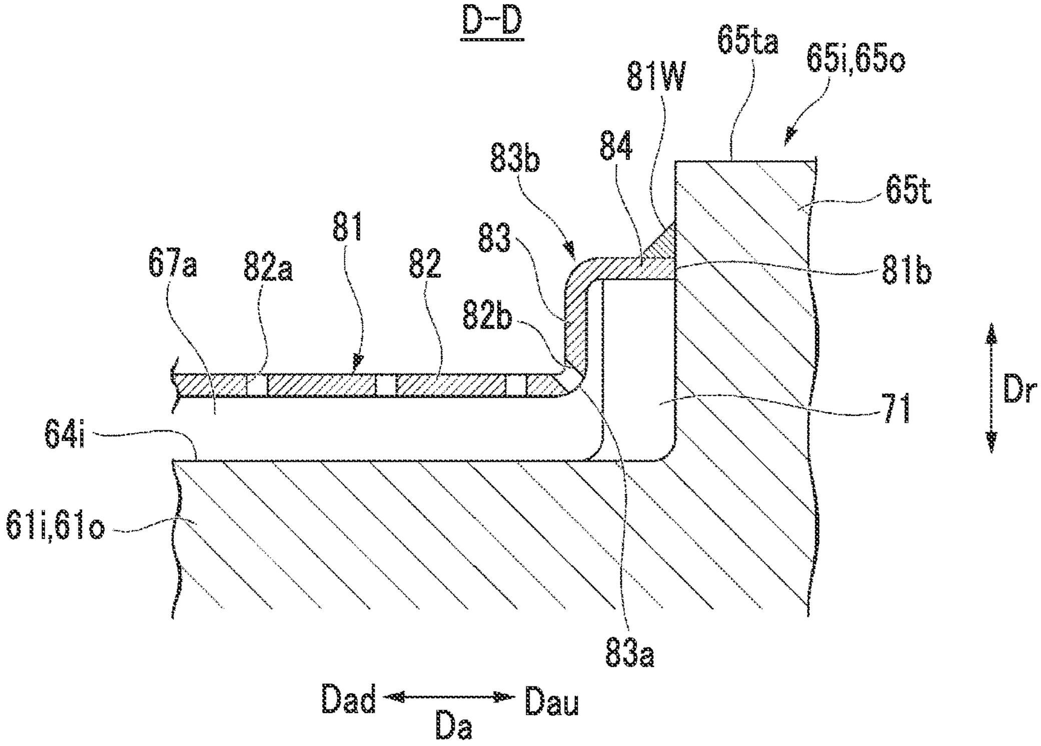
FIG. 8 is a sectional view illustrating a cross section taken along line D-D in FIG. 4.

FIG. 8 is a sectional view illustrating a cross section taken along line D-D in FIG. 4. In the embodiment illustrated in FIG. 8, an aspect of the following case is adopted. A range where the shelf is not formed between the first partition rib 60*rf* and the shelf 71*ia* is narrow in the circumferential direction Dc, and the strain absorber 83 of the impingement plate 81 is less likely to be processed, or is less likely to be attached. As illustrated in FIG. 8, when the impingement plate 81 is attached to the peripheral wall 65*i* in a narrow space region where the shelf 71 is not formed, a gap between the strain absorber 83 and the inner wall surface 65*a* of the peripheral wall 65*i* has to be larger, compared to a gap between the strain absorber 83 and the inner wall surface of the shelf 71 in an aspect where the shelf 71 illustrated in FIG. 7, is formed. When the region 73 where the shelf 71 is not formed is long and the gap is excessively large, in some cases, a corner portion where the peripheral wall 65*i* and the bottom plate 64 are connected may be insufficiently cooled. In this case, as illustrated in FIG. 8, a through-hole 82*b* which is an inclined passage facing the radial inner side Dri may be provided in the vicinity of the first bent portion 83*a* of the strain absorber 83.

In a structure of attaching the fixing portion 84 to the peripheral wall 65*i* which is a structure of the impingement plate 81 including the strain absorber 83, the structure adopts any one of a method of fixing to the surface 65*fa* (refer to FIG. 9) facing the radial inner side Dri on the peripheral wall 65*i*, a method of fixing to the support surface 72 (refer to FIG. 7) which is a surface facing the radial inner side Dri in the shelf 71, and a method (refer to FIG. 8) of fixing to the region 73 where the shelf 71 is not formed on the inner wall surface 65*a* of the peripheral wall 65*i*.

Figure 9:
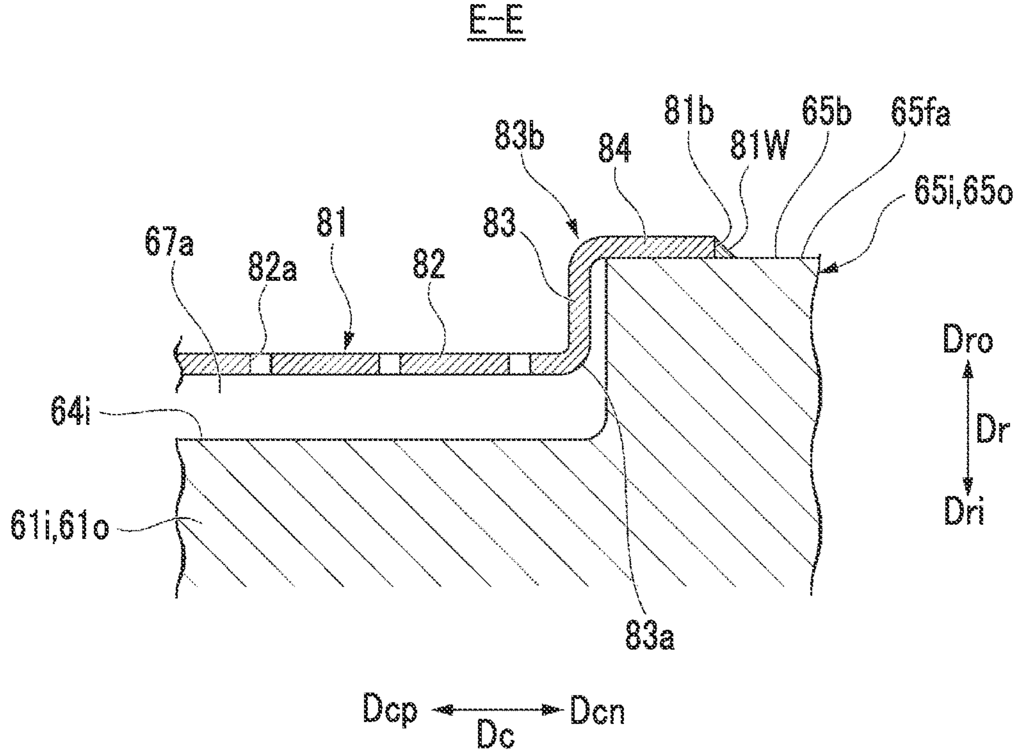
FIG. 9 is a sectional view illustrating a cross section taken along line E-E in FIG. 4.

FIG. 9 is a sectional view illustrating a cross section taken along line E-E in FIG. 4. The embodiment illustrated in FIG. 9 is an aspect in which the impingement plate 81 is attached to the suction-side peripheral wall 63*n* and the pressure-side peripheral wall 63*p*. According to the structure, the shelf 71 is not provided on the inner wall surface 65*a* of the suction-side peripheral wall 63*n* and of the pressure-side peripheral wall 63*p*. The fixing portion 84 of the impingement plate 81 having the strain absorber 83 is placed on the surface 65*fa* facing the radial inner side Dri of the peripheral wall 65*i*. The fixing portion 84 is directly fixed to the peripheral wall 65*i*.

In a case of the suction-side peripheral wall 63*n* and the pressure-side peripheral wall 63*p*, the effect of welding strain is less when the impingement plate 81 is welded to the peripheral wall 65*i*.

As illustrated in FIG. 5, as described above, the impingement plate 81 is fixed to the peripheral wall 65*i* on the outer peripheral side of the inner shroud 60*i*, and is fixed onto the blade body end portion 51*r* of the blade body on the inner peripheral side of the inner shroud 60*i*. The main body portion 82 fixed to the blade body 51 side of the impingement plate 81 is placed on an end surface facing the radial outer side Dro of the blade body end portion 51*r* while the same height as that of the main body portion 82 in the vicinity of the peripheral wall 65*i* is maintained. The main body portion 82 is welded and fixed to the blade body end portion 51*r* in a third edge 81*c*.

As illustrated in FIG. 4, the plurality of trailing edge purge cooling holes 91 (first purge cooling holes 91*i*) are formed on the rear peripheral wall 62*b* of the inner shroud 60*i*. One end of the plurality of first purge cooling holes 91*i* is open to the inner surface 64*i* of the inner shroud body 61*i* on a side closer to the rear peripheral wall 62*b* on the downstream side Dad from the blade body 51, which is the trailing edge portion 53 side on the downstream side Dad from the blade body 51. The other end of the plurality of first purge cooling holes 91*i* is open to a discharge opening 91*ia* formed on the gas pass surface 64*p*. The plurality of first purge cooling holes 91*i* disposed side by side along the extending direction (circumferential direction Dc) of the rear peripheral wall 62*b*. The plurality of first purge cooling holes 91*i* are formed only in the extending direction of the rear peripheral wall 62*b* which is the region 73 where the shelf 71 is not formed between the shelf 71*id* and the intermediate shelf 71*im* while the second partition rib 60*rb* is interposed therebetween. Since the plurality of first purge cooling holes 91*i* are provided, in the region 73 where the shelf 71 is not formed between the shelf 71*id* and the intermediate shelf 71*im* around the second partition rib 60*rb*, which is the region on the upstream side Dau of the rear peripheral wall 62*b*, a cooling effect that improves a convection cooling effect obtained by a cooling passage system (to be described later) is generated to improve an effect of reducing the thermal stress on the rear peripheral wall 62*b*.

As described above, the cooling passage system is provided on the rear peripheral wall 62*b* from the viewpoint of reducing the thermal stress on the rear peripheral wall 62*b*. As lustrated in FIG. 4, the cooling passage system is formed by a suction-side passage 78*n*, a pressure-side passage 78*p*, the trailing edge circumferential passage 79, and the trailing edge end portion passage 80. The suction-side passage 78*n* is open to the inner cavity 67*a* on the upstream side, and extends to the downstream side Dad inside the suction-side peripheral wall 63*n*. The pressure-side passage 78*p* is open to the inner cavity 67*a* on the upstream side, and extends to the downstream side Dad inside the pressure-side peripheral wall 63*p*. The trailing edge circumferential passage 79 extends in the circumferential direction Dc inside the rear peripheral wall 62*b*, is connected to the suction-side passage 78*n* in an end of the circumferential suction-side Dcn, and is connected to the pressure-side passage 78*p* in an end of the circumferential pressure-side Dcp. The plurality of trailing edge end portion passages 80 are arrayed in the circumferential direction Dc and are connected to the trailing edge circumferential passage 79 on the upstream side Dau, and the downstream side Dad is open to the rear end surface 62*ba*. The cooling air supplied from the outside to the outer cavity 67*b* of the inner shroud 60*i* is discharged to the inner cavity 67*a* via the through-hole 82*a* formed in the impingement plate 81, and impingement cooling (collision cooling) is performed on the bottom plate 64 of the inner shroud body 61*i*. The cooling air after the impingement cooling is supplied to the suction-side passage 78*n* and the pressure-side passage 78*p*, convection cooling is performed on the suction-side peripheral wall 63*n* and the pressure-side peripheral wall 63*p*, and thereafter, the cooling air is supplied to the trailing edge circumferential passage 79. The cooling air is further supplied from the trailing edge circumferential passage 79 to the trailing edge end portion passage 80, convection cooling is performed on the rear peripheral wall 62*b*, and thereafter, the cooling air is discharged to the combustion gas from the opening of the rear end surface 62*ba*. Since the cooling passage system is disposed, the rear peripheral wall 62*b* is cooled, and the thermal stress of the rear peripheral wall 62*b* is reduced.

<Configuration of Outer Shroud>

Figure 10:
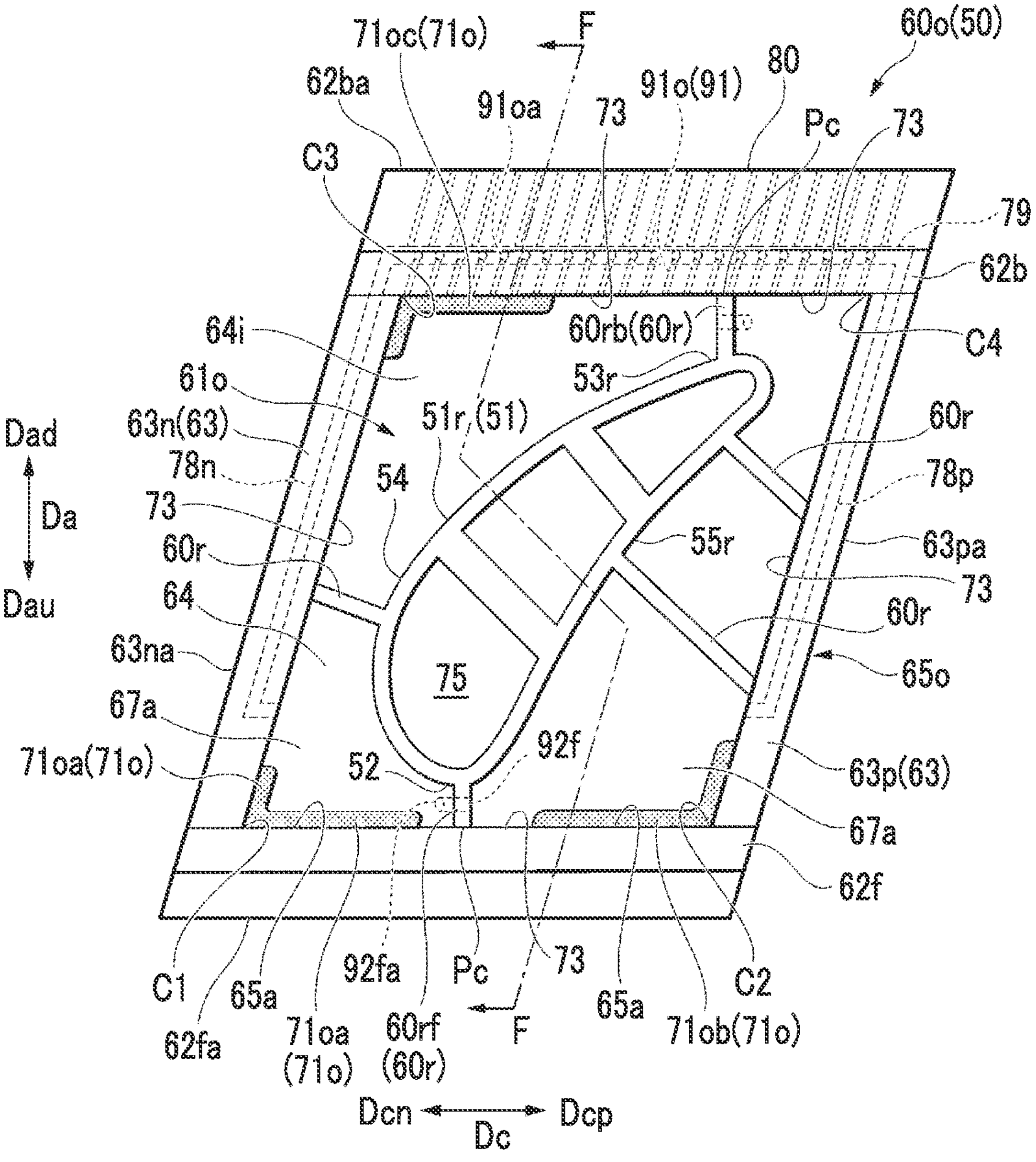
FIG. 10 is a view when an outer shroud in FIG. 3 is viewed from the radial outer side.
Figure 11:
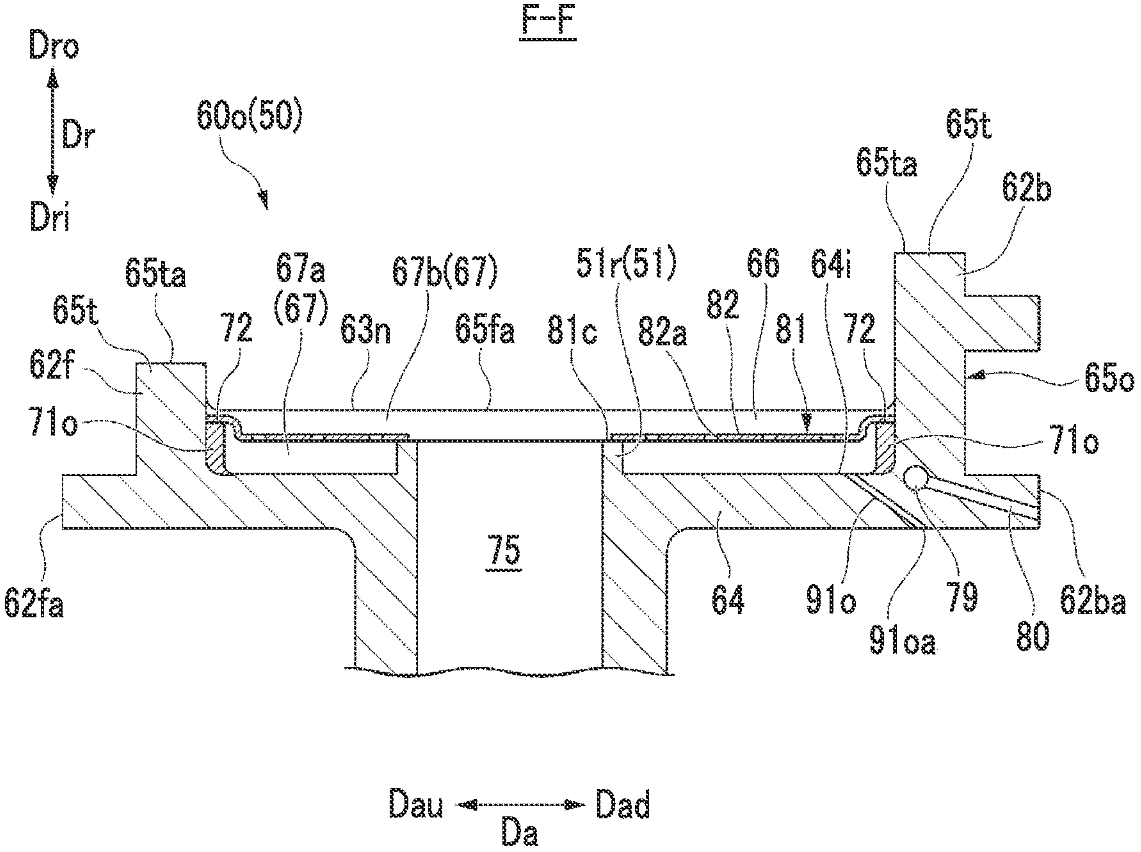
FIG. 11 is a sectional view taken along line F-F in FIG. 10.

As illustrated in FIGS. 3, 10, and 11, similar to the inner shroud 60*i*, the outer shroud 60*o* is configured to include the outer shroud body (shroud body) 61*o* and the impingement plate 81 accommodated inside the outer shroud body 61*o* and having the plurality of through-holes 82*a*.

The outer shroud body 61*o* is configured to include the bottom plate 64 forming the inner surface 64*i* of the outer shroud body 61*o* described above, the peripheral wall 65*o* disposed around the bottom plate 64, the partition rib 60*r* that partitions the space (cavity 67) inside the outer shroud body 61*o*, and the shelf 71 (71*o*) that supports the impingement plate 81. The peripheral wall 65*o* includes the front peripheral wall 62f and the rear peripheral wall 62b which face each other in the axial direction Da, and the pressure-side peripheral wall 63p and the suction-side peripheral wall 63n which face each other in the circumferential direction Dc. The peripheral wall 65o is disposed around the bottom plate 64, thereby forming the outer shroud body 61o. The recessed portion 66 recessed to the radial inner side Dri from the counter-flow path side is formed inside the outer shroud body 61o. An end surface on the upstream side Dau of the front peripheral wall 62f forms the front end surface 62fa. In addition, an end surface on the downstream side Dad of the rear peripheral wall 62b forms the rear end surface 62ba. In addition, the bottom plate 64 of the outer shroud body 61o includes the gas pass surface 64p facing the radial inner side Dri, and the inner surface (counter-flow path surface) 64i facing the radial outer side Dro which is the counter-flow path side opposite to the gas pass surface 64p.

The pressure-side peripheral wall 63p located on the circumferential pressure-side Dcp in a pair of circumferential end portions 63 forms the pressure-side end surface 63pa. The suction-side peripheral wall 63n located on the circumferential suction-side Dcn in the pair of circumferential end portions 63 forms the suction-side end surface 63na. In the outer shroud 60o described as an example in the present embodiment, similar to the inner shroud 60i, the front peripheral wall 62f and the rear peripheral wall 62b are substantially parallel to each other, and the pressure-side peripheral wall 63p and the suction-side peripheral wall 63n are substantially parallel to each other. Therefore, when viewed in the radial direction Dr, the outer shroud body 61o has a parallel quadrilateral shape.

The pressure-side peripheral wall 63p of the outer shroud 60o of one of the two stator blades 50 adjacent to each other in the circumferential direction Dc is disposed with a gap in the circumferential direction Dc on the suction side peripheral wall 63n of the outer shroud 60o of the other stator blade 50.

As described above, the peripheral wall 65o includes the front peripheral wall 62f and the rear peripheral wall 62b which face each other in the axial direction Da, and the pressure-side peripheral wall 63p and the suction-side peripheral wall 63n which face each other in the circumferential direction Dc.

The pressure-side peripheral wall 63p forms a portion located on the circumferential pressure-side Dcp on the peripheral wall 65o, and the suction-side peripheral wall 63n forms a portion located on the circumferential suction-side Dcn on the peripheral wall 65o.

Both the front peripheral wall 62f and the rear peripheral wall 62b protrude to the radial outer side Dro from the pressure-side peripheral wall 63p and to the suction-side peripheral wall 63n with respect to the outer shroud body 61o.

Here, a concept of the thermal stress acting on the outer shroud 60o will be described below. As described above, the deformation on the hook 69 side is restricted by the influence of the thermal elongation difference in the fitting portion 69a between the hook 69 of the outer shroud 60o and the thermal barrier ring 45c, and the thermal stress is generated between the suction-side end surface 63na and the pressure-side end surface 63pa in the circumferential direction of the rear peripheral wall 62b of the outer shroud 60o. In addition, the rear peripheral wall 62b of the outer shroud 60o tends to be elongated in the circumferential direction Dc due to the heat input from the combustion gas. However, the thermal elongation is restricted by the partition rib 60r that joins the blade body end portion 51r of the blade body 51 and the inner wall surface 65a of the rear peripheral wall 62b, and the thermal stress acts cumulatively in the circumferential direction Dc of the rear peripheral wall 62b.

In order to reduce the thermal stress acting on the outer shroud 60o, in the outer shroud 60o, the trailing edge end portion passage 80 and the trailing edge purge cooling hole 91 (second purge cooling hole 91o) are disposed on the rear peripheral wall 62b. Furthermore, in the outer shroud 60o, the shelf 71 is partially disposed along the peripheral wall 65o, and the region (portion having no shelf) 73 where the shelf 71 is not formed is disposed in a region where the thermal stress is high. In this manner, the thermal strain of the outer shroud 60o is suppressed, and reduced thermal stress is achieved.

As illustrated in FIG. 10, in a case of the outer shroud 60o, as described above, the plurality of trailing edge end portion passages 80 are formed on the rear peripheral wall 62b disposed on the trailing edge portion 53 side of the outer shroud 60o. The plurality of trailing edge end portion passages 80 are arrayed over the entire width from the suction-side end surface 63na to the pressure-side end surface 63pa. In addition, on the rear peripheral wall 62b, in order to improve the cooling on the gas pass surface 64p side where the trailing edge circumferential passages 79 are arrayed, the plurality of trailing edge purge cooling holes 91 (second purge cooling holes 91o) described above are cumulatively arrayed in the radial direction Dr over the entire width from the suction-side end surface 63na to the pressure-side end surface 63pa of the rear peripheral wall 62b.

Therefore, as illustrated in FIG. 10, the peripheral wall 65c having the region 73 where the shelf 71 is not formed is disposed between a shelf 71oc formed to include the third corner C3 and the fourth corner C4 while the partition rib 60r (second partition rib 60rb) is interposed therebetween, in the region where the thermal stress is high, on the inner wall surface 65a of the rear peripheral wall 62b, and the thermal stress of the rear peripheral wall 62b is reduced.

On the other hand, as illustrated in FIG. 10, the front peripheral wall 62f on the leading edge portion 52 side of the outer shroud 60o is hardly restricted from the gas turbine casing 15 side, compared to the rear peripheral wall 62b of the outer shroud 60o. In addition, as described above, the thermal stress is generated on the front peripheral wall 62f due to the restriction of the partition rib 60r (first partition rib 60rf) that joins the blade body end portion 51r of the leading edge portion 52 of the blade body 51 and the inner wall surface 65a of the front peripheral wall 62f. However, a range where the thermal stress is generated is relatively smaller, compared to the rear peripheral wall 62b.

<<Configuration of Partition Rib of Outer Shroud>>

The plurality of partition ribs 60r are formed in the outer shroud 60o. The partition rib 60r formed on the outer shroud 60o has the same structure as the partition rib 60r formed in the inner shroud 60i, and protrudes to the radial outer side Dro from the inner surface 64i of the outer shroud body 61c. Similar to the inner shroud 60i, five partition ribs 60r are formed in the outer shroud 60o of the present embodiment. The space (cavity 67) which is the recessed portion 66 of the outer shroud 60o forms the cavity 67 partitioned into the plurality of spaces in such a manner that the recessed portion 66 is partitioned by disposing the plurality of partition ribs 60r between the blade body end portion 51r and the peripheral wall 65o. In addition, the height from the inner surface 61i of the outer shroud 60o of the blade body end portion 51r, which is an end portion on the radial outer side Dro and the radial inner side Dri of the blade body 51, is the same height as the partition rib 60_r_. However, the height may be changed depending on a shape of the shroud.

Specifically, the partition ribs 60_r_ of the outer shroud 60_o_ are provided one by one between the blade body end portion 51_r_ of the leading edge portion 52 on the most upstream side Dau of the blade body 51 and the inner wall surface 65_a_ of the front peripheral wall 62_f_, between the trailing edge portion 53 on the most downstream side Dad of the blade body 51 and the inner wall surface 65_a_ of the rear peripheral wall 62_b_, and between the suction-side surface 54 of the blade body 51 and the inner wall surface 65_a_ of the suction-side peripheral wall 63_n_. Furthermore, two partition ribs 60_r_ of the outer shroud 60_c_ are provided at an interval in the axial direction Da between the blade body end portion 51_r_ of the pressure-side surface 55 of the blade body 51 and the inner wall surface 65_a_ of the pressure-side peripheral wall 63_p_ of the peripheral wall 65_o_. The number or the disposition of the partition ribs 60_r_ formed in the outer shroud 60_o_ is an example, and is not limited to the above-described configuration. The disposition of the partition ribs 60_r_ is different from that of the inner shroud 60_i_. However, the shape or the structure is formed by using substantially the same concept.

<<Range for Disposing Shelf of Outer Shroud>>

As illustrated in FIG. 10, similar to the peripheral wall 65_i_ of the inner shroud 60_i_ described above, the peripheral wall 65_o_ of the outer shroud 60_o_ has the first corner C1, the second corner C2, the third corner C3, and the fourth corner C4 which are the four corners of the inner wall surface 65_a_. The first corner C1 is formed by the inner wall surface 65_a_ of the suction-side peripheral wall 63_n_ and by the inner wall surface 65_a_ of the front peripheral wall 62_f_. The second corner C2 is formed by the inner wall surface 65_a_ of the pressure-side peripheral wall 63_p_ and by the inner wall surface 65_a_ of the front peripheral wall 62_t_. The third corner C3 is formed by the inner wall surface 65_a_ of the suction-side peripheral wall 63_n_ and by the inner wall surface 65_a_ of the rear peripheral wall 62_b_. The fourth corner C4 is formed by the inner wall surface 65_a_ of the pressure-side peripheral wall 63_p_ and by the inner wall surface 65_a_ of the rear peripheral wall 62_b_. In the outer shroud 60_o_ in the present embodiment, the shelves 71 are formed in the first corner C1, the second corner C2, and the third corner C3, and the shelf 71 is not disposed in the fourth corner C4.

Meanwhile, as described above, the rear peripheral wall 62_b_ and the front peripheral wall 62_f_ tend to be elongated in the circumferential direction Dc due to the heat input from the combustion gas. However, the thermal elongation is restricted by the partition ribs 60_r_ (first partition rib 60_rf_, second partition rib 60_rb_) that respectively join the blade body end portion 51_r_ of the blade body 51, and the inner wall surface 65_a_ of the rear peripheral wall 62_b_ and the inner wall surface 65_a_ of the front peripheral wall 62_f_. Therefore, the thermal stress partially high in the circumferential direction Dc acts on the rear peripheral wall 62_b_ and the front peripheral wall 62_f_ around the position Pc of the joining portion joined to the partition ribs 60_r_ (first partition rib 60_rf_, second partition rib 60_rb_).

As illustrated in FIG. 10, in a case of the rear peripheral wall 62_b_ of the outer shroud 60_o_, only the shelf 71_oc_ including the third corner C3 and extending to the circumferential pressure-side Dcp is disposed on the inner wall surface 65_a_ of the rear peripheral wall 62_b_. That is, only the partition rib 60_r_ (second partition rib 60_rb_) is disposed between the end portion on the circumferential pressure-side Dcp of the shelf 71_oc_ and the fourth corner C4, and the region 73 where the shelf 71 is not formed is disposed. Meanwhile, the position Pc in the circumferential direction Dc of the second partition rib 60_rb_ is closer to the pressure-side end surface 63_pa_ side than a center position in the circumferential direction Dc of the width from the auction-side end surface 63_na_ to the pressure-side end surface 63_pa_ of the outer shroud body 61_o_. The thermal stress acting on the rear peripheral wall 62_b_ is the highest in the vicinity of the position Pc of the second partition rib 60_rb_, and the thermal stress gradually decreases in a direction toward the circumferential suction-side Dcn and in a direction toward the circumferential pressure-side Dcp. In a case of the rear peripheral wall 62_b_ of the outer shroud 60_o_, the length of the region 73 where the shelf 71 is not formed between the position Pc of the second partition rib 60_rb_ and the end portion on the circumferential pressure-side Dcp of the shelf 71_oc_ is longer than the length of the region 73 where the shelf 71 is not formed between the position Pc of the second partition rib 60_rb_ and the fourth corner C4.

In a case of the front peripheral wall 62_f_, the concept of the thermal stress acting on the front peripheral wall 62_f_ is the same as that of the inner shroud 60_i_. In a case of the front peripheral wall 62_f_, since the heat input from the combustion gas is small, there is less thermal stress generated on the front peripheral wall 62_f_. A case of the front peripheral wall 62_f_ does not include a cooling structure such as the trailing edge end portion passage 80 and the trailing edge purge cooling hole 91. Similar to the rear peripheral wall 62_b_, a shelf 71_oa_ including the first corner C1 and extending to the circumferential pressure-side Dcp and a shelf 71_ob_ including the second corner C2 and extending to the circumferential suction-side Dcn are disposed on the inner wall surface 65_a_ of the front peripheral wall 62_f_, and the first partition rib 60_rf_ interposed from both sides in the circumferential direction Dc by the region 73 where the shelf 71 is not formed is disposed between the shelf 71_oa_ and the shelf 71_ob_.

Since the regions 73 where the shelves 71 are not formed are disposed on both sides in the circumferential direction Dc while the first partition rib 60_rf_ is interposed therebetween, the thermal stress generated on the front peripheral wall 62_f_ is reduced.

The concept of disposing the shelves 71 on the suction-side peripheral wall 63_n_ and on the pressure-side peripheral wall 63_p_ is the same as that of the inner shroud 60_i_.

<<Configuration Around Shelf of Outer Shroud>>

As illustrated in FIGS. 10 and 11, similar to the inner shroud 60_i_, the shelf 71_o_ that supports the impingement plate 81 is provided in the outer shroud 60_o_. The shelf 71_o_ protrudes to the radial outer side Dro from the inner surface 64_i_ of the bottom plate 64 of the outer shroud body 61_o_ along the inner wall surface 65_a_ of the peripheral wall 65_o_. That is, the shelf 71_o_ protrudes to the counter-flow path side (radial outer side Dro) opposite to the gas pass surface 54_p_ in the radial direction Dr with reference to the inner surface 64_i_ of the bottom plate 64 of the outer shroud body 61_o_. The shelf 71_o_ has the support surface 72 facing the counter-flow path side, which is the radial outer side Dro side with respect to the gas pass surface 64_p_ serving as the flow path side, and supports the impingement plate 81.

As illustrated in FIG. 11, the support surface 72 of the shelf 71_o_ provided in the outer shroud 60_o_ is located on a side closer to the inner surface 64_i_ of the bottom plate 64 of the outer shroud body 61_o_ than the end portion 65_t_ of the peripheral wall 65_o_ in the radial direction Dr. In addition, the support surface 72 of the shelf 710 of the outer shroud 60_o_ is located on the radial outer side Dro from a surface facing the radial outer side Dro of the partition rib 60_r_ described above in the radial direction Dr. In other words, the height of the shelf 71*o* with reference to the inner surface 64*i* of the outer shroud body 61*o* in the radial direction Dr is lower than the height of the peripheral wall 65*o* with reference to the same inner surface 64*i*. In addition, in the present embodiment, the thickness of the shelf 71*o* of the outer shroud 60*o* in a direction protruding to the blade body end portion 51*r* side from the inner wall surface 65*a* of the peripheral wall 65*o* is thinner than the thickness of the peripheral wall 65*o* in the same direction as the direction of the thickness of the shelf 710.

As illustrated in FIG. 11, the surface 65*fa* facing the radial outer side Dro of the suction-side peripheral wall 63*v* and of the pressure-side peripheral wall 63*p* is closer to the inner surface 64*i* of the bottom plate 64 than the position of the surface 65*ta* facing the radial outer side Dro of the end portion 65*t* of the front peripheral wall 62*f* and of the rear peripheral wall 62*b*, and is formed at substantially the same height as the position of the support surface 72 of the shelf 71*o*.

<<Configuration of Impingement Plate of Outer Shroud>>

As illustrated in FIG. 11, similar to the inner shroud 60*i*, the impingement plate 81 is attached to the outer shroud 60*o*. The impingement plate 81 partitions the space inside the recessed portion 66 of the outer shroud 60*o* into a region on the radial outer side Dro and the cavity 67, which a region on the radial inner side Dri. A plurality of through-holes 82*a* penetrating in the radial direction Dr are formed in the impingement plate 81. A portion of the cooling air Ac supplied to the recessed portion 66 of the stator blade 50 flows into the cavity 67 via the through-hole 82*a* formed in the main body portion 82 of the impingement plate 81. Structural details of the impingement plate 81 of the outer shroud 60*o* are the same as those of the impingement plate 81 of the inner shroud 60*i*.

As illustrated in FIGS. 6 to 9, the impingement plate 81 attached to the outer shroud 60*c* includes the main body portion 82 having the plurality of through-holes 82*a*, the strain absorber 83 that absorbs the thermal strain of the main body portion 82, and the fixing portion 84 that fixes the main body portion 82 to the shroud 60. The main body portion 82 is a member including the plurality of through-holes 82*a* and extending to the inner wall surface 65*a* of the peripheral wall 65*o* in parallel to the inner surface 64*l* of the bottom plate 64 of the outer shroud body 61*o*. The structure of the strain absorber 83 and the fixing portion 84 is the same as that in a case of the inner shroud 60*i*. In addition, the structure for fixing the impingement plate 81 to the blade body 51 is the same as that in a case of the inner shroud 60*i*.

Similar to the inner shroud body 61*i*, the plurality of trailing edge purge cooling holes 91 (second purge cooling holes 51*o*) are formed in the outer shroud body 61*o* of the outer shroud 60*o*. One end of the plurality of second purge cooling holes 91*o* is open to the inner surface 64*i* of the outer shroud body 61*o* on a side closer to the rear peripheral wall 62*b* on the downstream side Dad than the blade body 51, which is the trailing edge portion 53 side on the Dad downstream side Dad from the blade body 51. In addition, the other end of the plurality of second purge cooling holes 91*o* is open to discharge openings 91*oa* formed in the gas pass surface 64*p*. The plurality of second purge cooling holes 91*o* are set over substantially the entire width from the suction-side end surface 63*na* to the pressure-side end surface 63*pa*, unlike the first purge cooling holes 91*i* provided in the inner shroud 60*i*. The reason is that the outer shroud 60*o* has higher thermal stress on the rear peripheral wall 62*b*, compared to the inner shroud 60*i*. In a case of the outer shroud 60*o*, on the upstream side Dau on the entire surface in the circumferential direction Dc of the rear peripheral wall 62*b*, a region on the upstream side Dau is supplementarily cooled from the trailing edge circumferential passage 79 of the rear peripheral wall 62*b*. That is, cooling capacity of the trailing edge end portion passage 80 is supplemented by providing the plurality of second purge cooling holes 91*o* as described above.

In order to cool the rear peripheral wall 62*b* of the outer shroud 60*o*, a cooling structure formed from the trailing edge end portion passage 80, the trailing edge circumferential passage 79, the suction-side passage 78*n*, and the pressure-side passage 78*p* is applied in the same manner as that in a case of the inner shroud 60*i*.

<<Operational Effect of Embodiment>>

The stator blade 50 of the above-described embodiment includes at least the blade body 51 disposed in the combustion gas flow path 49 through which the combustion gas flows, and the inner shroud 60*i* and the outer shroud 60*o* which include the bottom plate 64 defining a portion of the combustion gas flow path 49. The inner shroud 60*i* and the outer shroud 60*o* are formed to include the inner shroud body 61*i* and the outer shroud body 61*o* which have the gas pass surface 64*p* facing the combustion gas flow path 49 of the bottom plate 64, and the inner surface 64*i* facing the counter-flow path side opposite to the gas pass surface 64*p*; the peripheral walls 65*i* and 65*o* protruding toward the counter-flow path side from the peripheral edge of the inner surface 64*i* of the inner shroud body 61*i* and the outer shroud body 61*o*; the impingement plate 81 attached to the inner shroud body 61*i* and to the outer shroud body 61*o*, having the plurality of through-holes 82*a*, and forming the cavity 67 which is the space between the inner surface 64*i* of the bottom plate 64 and the inner wall surface 65*a* of the peripheral walls 65*i* and 65*o*; the shelves 71*i* and 71*o* formed along the inner wall surface 65*a* of the peripheral walls 65*i* and 65*o*, protruding to the counter-flow path side from the inner surface 64*i* of the bottom plate 64, and supporting the impingement plate 81; and at least one or more partition ribs 60*r* protruding to the counter-flow path side from the bottom plate 64, and joining the blade body 51 and the peripheral walls 65*i* and 65*o* having the region 73 where the shelf 71 is not formed. The impingement plate 81 forms the cavity 67 which is the space between the inner surface 64*i* of the bottom plate 64 and the inner wall surface 65*a* of the peripheral walls 65*i* and 65*o*.

According to the configuration of the stator blade 50 of the above-described embodiment, during a normal operation of the gas turbine 10, in some cases, high thermal stress may be locally generated on the rear peripheral wall 62*b* and the front peripheral wall 62*f*, due to a thermal elongation difference between the blade body 51 forming the stator blade and the rear peripheral wall 62*b* and the front peripheral wall 62*f* which are connected via the partition ribs 60*r* (first partition rib 60*rf*, second partition rib 60*rb*). In addition, in some cases, the thermal stress may be generated particularly on the rear peripheral wall 62*b*, due to the thermal elongation difference between gas turbine components. As means for reducing the thermal stress, as described below, the region (portion having no shelf) 73 where the shelf 71 is not formed is disposed on the inner wall surface 65*a* of the peripheral walls 65*i* and 65*o*. In this manner, both problems are solved so that the thermal strain or the thermal deformation of the shroud is suppressed, and the thermal stress generated around the front peripheral wall 62*f* or the rear peripheral wall 62*b* is reduced.

That is, in the inner shroud 60*i* and the outer shroud 60*o*, the shelves 71*i* and 71*o* are not provided in the portion where the partition rib 60*r* is joined to the peripheral walls 65*i* and 65*o*, and the partition rib 60*r* is directly joined to the inner wall surfaces 65*a* of the peripheral walls 65*i* and 65*o*. Therefore, rigidity of the shroud 60 can be reduced.

Therefore, it is possible to suppress the thermal stress generation in the portion (position Pc) where the partition rib 60*r* reaches the peripheral walls 65*i* and 65*o* by extending from the blade body end portion 51*r*.

In the stator blade 50 of the above-described embodiment, the blade body 51 has the leading edge portion 52 located on the upstream side Dau of the combustion gas flow in the combustion gas flow path 49, the trailing edge portion 53 located on the downstream side Dad of the combust ion gas flow, and the pressure-side surface 55 and the suction-side surface 54 which connect the leading edge portion 52 and the trailing edge portion 53 and face sides opposite to each other in the circumferential direction Dc. The shelves 71*i* and 71*o* are formed along the inner wall surface 65*a* of the peripheral walls 65*i* and 65*o*. The peripheral walls 65*i* and 65*o* are formed to include the front peripheral wall 62*f* facing the upstream side Dau and located on the upstream side Dau from the blade body 51, the rear peripheral wall 62*b* facing the downstream side Dad and located on the downstream side Dad from the blade body 51, the pressure-side peripheral wall 63*p* connecting the front peripheral wall 62*f* and the rear peripheral wall 62*b* and located on a side close to the pressure-side surface 55, and the suction-side peripheral wall 63*n* connecting the front peripheral wall 62*f* and the rear peripheral wall 62*b* and located on a side close to the suction-side surface 54. The shelves 71*i* and 71*o* are respectively formed in the third corner C3 formed by the inner wall surface 65*a* of the suction-side peripheral wall 63*n* and by the inner wall surface 65*a* of the rear peripheral wall 62*b*, and the first corner C1 formed by the inner wall surface 65*a* of the suction-side peripheral wall 63*n* and by the inner wall surface 65*a* of the front peripheral wall 62*f*. In addition, in the stator blade 50 of the above-described embodiment, the shelves 71*i* and 710 are formed to include the inner wall surface 65*a* of the pressure-side peripheral wall 63*p* and the second corner C2 formed by the inner wall surface 65*a* of the front peripheral wall 62*f*.

In the stator blade 50 of the above-described embodiment, the inner shroud 60*i* and the outer shroud 60*o* include at least one of the first partition rib 60*rf* serving as the partition rib 60*r* that joins the peripheral walls 65*i* and 65*c* and the blade body end portion 51*r* on the leading edge side of the blade body 51, and the second partition rib 60*rb* serving as the partition rib 60*r* that joins the peripheral walls 65*i* and 65*o* and the blade body end portion 51*r* on the trailing edge side of the blade body 51. The first partition rib 60*rf* has a first rib cooling hole 92*fa* in which one end is open to the inner wall surface of the first partition rib 60*rf* and the other end is open to the gas pass surface 64*p* of the bottom plate 64, and which penetrates the first partition rib 60*rf*. The second partition rib 60*rb* has a second rib cooling hole 92*ba* in which one end is open to the inner wall surface of the second partition rib 60*rb* and the other end is open to the gas pas surface 64*p* of the bottom plate 64, and which penetrates the second partition rib 60*rb*.

In the stator blade 50 of the above-described embodiment, the impingement plate 81 includes the main body portion 82 extending in parallel to the inner surface 64*i* of the inner shroud body 61*i* and of the outer shroud body 61*o*, and the first bent portion 83*a* and the second bent portion 33*b* in both ends, and includes the strain absorber 83 extending in the radial direction with a predetermined inclination with respect to the main body portion 82 while one end is connected to the main body portion 82, and the fixing portion 84 connected to the second bent portion 83*b* formed in the other end of the strain absorber 83. The fixing portion 84 is fixed to any one of the surface 65*fa* facing the counter-flow path side on the peripheral walls 65*i* and 65*o*, the support surface 72 facing the counter-flow path side in the shelf 71, and the region 73 where the shelf 71 is not provided on the inner wall surface 65*a* of the peripheral walls 65*i* and 65*o*.

According to the configuration or the stator blade 50 of the above-described embodiment, when the impingement plate 81 is welded to the inner shroud 60*i* and the outer shroud 60*o*, even in a case where the impingement plate 81 is thermally elongated due to the heat input caused by welding, the thermal elongation can be absorbed by elastic deformation of the strain absorber 83. Therefore, it is possible to reduce the probability that the strain caused by the welding may be generated in the main body portion 82 of the impingement plate 81.

In the stator blade 50 of the above-described embodiment, the inner shroud body 61*i* and the outer shroud body 610 include the plurality of trailing edge purge cooling holes 91 open to the inner surface 64*i* on the counter-flow path side closer to the rear peripheral wall 62*b* than the blade body 51 and extending toward the downstream side Dad. The plurality of trailing edge purge cooling holes 91 are disposed side by side along the circumferential direction of the rear peripheral wall 62*b*, one end is open to the inner surface 64*i* of the bottom plate 64 in which the cavity 67 is formed, and the other end is open to the discharge opening 91*oa* formed on the gas pass surface 64*p*. The rear peripheral wall 62*b* in which the trailing edge purge cooling holes 91 are disposed includes the region where the shelf 71 is not formed.

According to the stator blade 50 of the above-described embodiment, a temperature rise of the rear peripheral wall 62*b* in a range where the trailing edge purge cooling holes 91 are disposed is suppressed by the cooling air Ac passing through the trailing edge purge cooling holes 91. Therefore, since the region 73 where the shelf 71 is not formed is included on the rear peripheral wall 62*b* of the range, the thermal stress can be reduced in the region where the temperature rise is suppressed.

In the stator blade 50 of the above-described embodiment, the second partition rib 60*rb* is disposed in the region 73 where the shelf 71 of the rear peripheral wall 62*b* on which the trailing edge purge cooling holes 91 are disposed is not formed.

According to the stator blade 50, the thermal stress can be reduced by connecting the second partition rib 60*rb* to the region 73 of the rear peripheral wall 62*b* where the trailing edge purge cooling holes 91 are disposed and the shelf 71 is not formed.

In the stator blade 50 of the above-described embodiment, the shelf 71*i* of the inner shroud body 61*i* is formed to further include the fourth corner C4 formed by the inner wall surface 65*a* of the pressure-side peripheral wall 63*p* and by the inner wall surface 65*a* of the rear peripheral wall 62*b*.

According to the stator blade 50, the shelf 71*i* holds the rigidity of the inner shroud body 61*i* in the fourth corner C4, and serves as the support surface for the impingement plate 81. The shelf 71*i* is used for the support surface 72 of the impingement plate 81. In this manner, the height of the impingement plate from the inner surface 64*i* can be accurately attached, and proper impingement cooling (collision cooling) can be performed on the bottom plate 64.

In the stator blade 50 of the above-described embodiment, the shelf 71*i* is formed to include the intermediate shelf 71*im* disposed between the shelf 71*ic* extending along the inner wall surface 65*a* of the rear peripheral wall 62*b* and including the third corner C3 and the shelf 71*id* extending along the inner wall surface 65*a* of the rear peripheral wall 62*b* and including the fourth corner C4, formed along the inner wall surface 65*a* of the rear peripheral wall 62*b*, protruding to the counter-flow path side from the inner surface 64*i* of the bottom plate 64, and supporting the impingement plate 81. The intermediate shelf 71*im* is interposed from both sides in the circumferential direction Dc by the region 73 where the shelf 71*im* is not formed, and the second partition rib 60*rb* is disposed between the fourth corner C4 and the intermediate shelf 71*im*.

According to the stator blade 50, the region 73 where the shelf 71 is not formed is provided between the third corner C3 and the fourth corner C4 of the inner shroud body 61*i*, and the rigidity of the rear peripheral wall 62*b* is reduced. In this manner, the thermal stress generated on the rear peripheral wall 62*b* can be reduced. In addition, the impingement plate 81 can be supported by the intermediate shelf 71*im*, and the impingement plate 81 can be disposed at a proper height.

In the stator blade 50 of the above-described embodiment, the trailing edge purge cooling hole 91 includes the plurality of trailing edge purge cooling holes 91 (first purge cooling holes 91*i*) disposed between the intermediate shelf 71*im* and the fourth corner C4 of the inner shroud body 61*i* while the second partition rib 60*rb* is interposed therebetween.

According to the stator blade 50, the second partition rib 60*rb* is connected to the region 73 where the shelf 71 is not formed between the intermediate shelf 71*im* of the rear peripheral wall 62*b* and the fourth corner C4. In this manner, the thermal stress of the rear peripheral wall 62*b* is reduced.

In the stator blade 50 of the above-described embodiment, the shroud body 61 includes the outer shroud body 61*o* disposed on the radial outer side Dro of the blade body 51, and the trailing edge purge cooling hole 91 includes the plurality of trailing edge purge cooling holes 91 (second purge cooling holes 91*o*) disposed between the third corner C3 of the outer shroud body 61*o* and the fourth corner C4 of the outer shroud 60*o* formed by the inner wall surface 65*a* of the pressure-side peripheral wall 63*p* and by the inner wall surface 65*a* of the rear peripheral wall 62*b*.

According to the stator blade 50, the temperature rise of the rear peripheral wall 62*b* can be suppressed by the second purge cooling hole 91*o* between the third corner C3 and the fourth corner C4 of the outer shroud 60*o*. Therefore, it is possible to suppress the thermal stress in the region where the temperature rise of the rear peripheral wall 62*b* is suppressed.

In the stator blade 50 of the above-described embodiment, the inner shroud body 61*i* and the outer shroud body 61*o* have the cavity 67 surrounded by the peripheral walls 65*i* and 65*o* and having the recessed portion 66 recessed to the gas pass surface 64*p* side from the counter-flow path side in the radial direction Dr. In addition, the inner shroud body 61*i* and the outer shroud body 610 have the cooling structure including the trailing edge circumferential passage 79 formed in the rear peripheral wall 63*b* and extending in the circumferential direction Dc, the suction-side passage 78*n* formed on the suction-side peripheral wall 63*n*, having one end open to the cavity 67 and the other end connected to one end portion of the trailing edge circumferential passage 79, the pressure-side passage 78*p* formed on the pressure-side peripheral wall 63*p*, having one end open to the cavity 67 and the other end connected to the other end portion of the trailing edge circumferential passage 79, and the trailing edge end portion passage 80 formed in the circumferential direction Dc of the rear peripheral wall 62*b*, having one end connected to the trailing edge circumferential passage 79 and the other end being open to the rear end surface 62*ba* on the downstream side Dad of the rear peripheral wall 62*b*. The discharge opening 91*ia* of the trailing edge purge cooling hole 91 is formed on the downstream side Dad of a passage center line of the trailing edge circumferential passage 79 extending in the circumferential direction Dc.

Since the above-described cooling structure is provided, convection cooling is performed on the suction-side peripheral wall 63*n*, the pressure-side peripheral wall 63*p*, and the rear peripheral wall 62*b* in which severe thermal stress is generated, and the thermal stress is reduced or the trailing edge portion 53 side of the inner shroud body 61*i* and of the outer shroud body 61*o*. In addition, with regard to the cooling air Ac, the cooling air Ac obtained by performing impingement cooling (collision cooling) or the bottom plate 64 heated due to the heat input from the gas pass surface 64*p* of the inner shroud body 61*i* and of the outer shroud body 61*o* is used. Furthermore, according to the above-described cooling structure, the convection cooling is performed on the suction-side peripheral wall 63*n*, the pressure-side peripheral wall 63*p*, and the rear peripheral wall 62*b* by using the cooling air Ac. Therefore, the cooling air is reused, and the amount of the cooling air is reduced.

The gas turbine 10 of the above-described embodiment includes the stator blade 50, the gas turbine rotor 11 rotatable by the combustion gas, and the gas turbine casing (casing) 15 that covers the gas turbine rotor 11. The stator blade 50 is disposed inside the gas turbine casing 15, and is fixed to the gas turbine casing 15.

According to the gas turbine 10 of the above-described embodiment, reliability can be improved by suppressing the generation of the thermal deformation and the thermal stress of the stator blade 50.

<<Seal Groove Structure>>

A seal groove 100 (refer to FIG. 3) is formed on the suction-side peripheral wall 63*n* of the shroud bodies 61*i* and 61*o* of the shroud 60 (inner shroud 60*i*, outer shroud 60*o*) and on the outer wall surface 65*b* of the pressure-side peripheral wall 63*p*, and a seal member 110 is disposed between the shroud bodies 61*i* and 61*o* of the stator blades 50 adjacent to each other via the seal groove 100 in the circumferential direction Dc. Since the seal member 110 is disposed, the cooling air Ac supplied to the shroud bodies 61*i* and 61*o* from a gap formed between the outer wall surface 65*b* of the suction-side peripheral wall 63*n* or the pressure-side peripheral wall 63*p* and the outer wall surface 651) of the pressure-side peripheral wall 63*p* or the suction-side peripheral wall 63*n* of the stator blades 50 disposed adjacent to each other is suppressed from flowing out to the combustion gas flow path 49.

Figure 12:
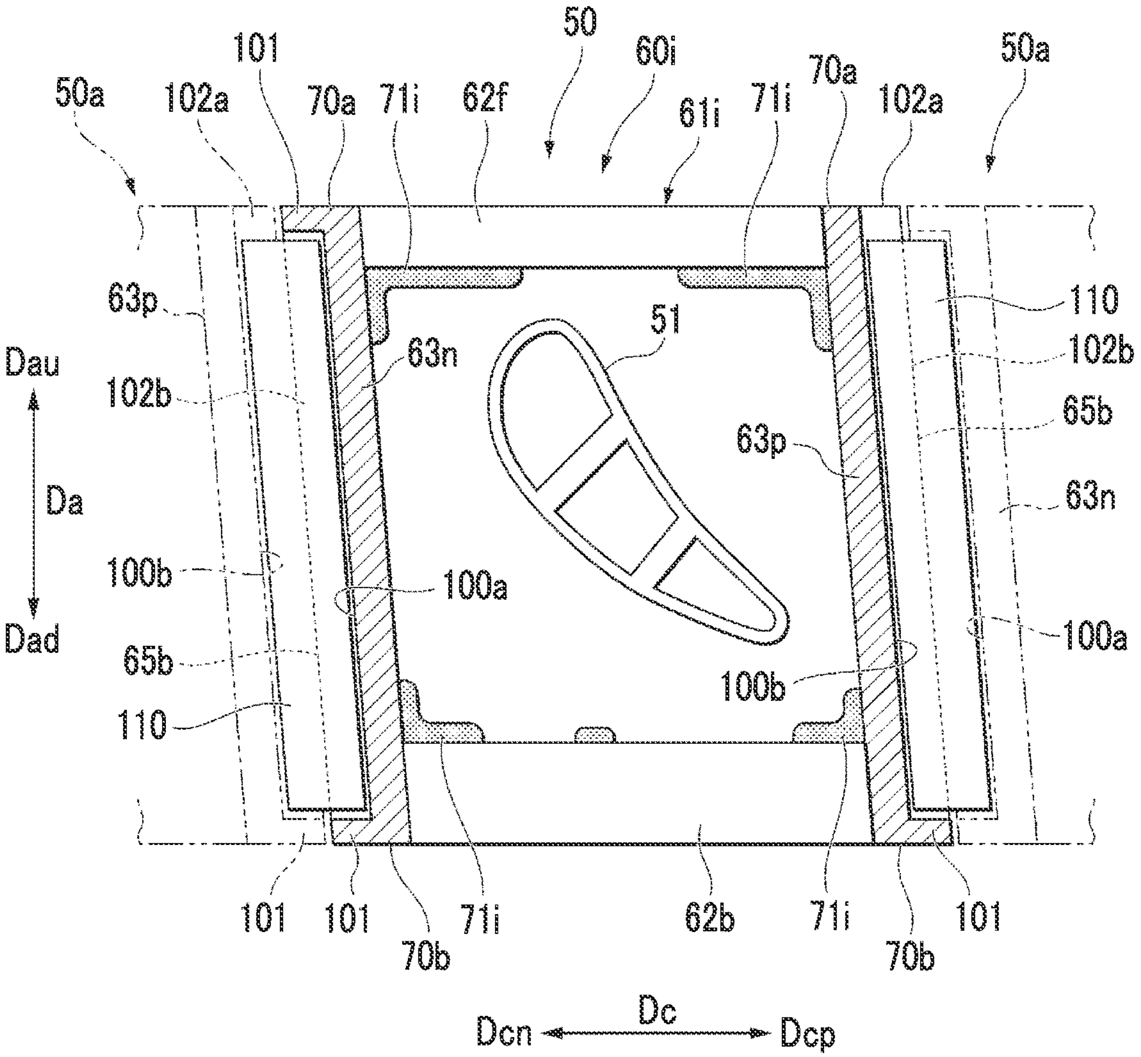
FIG. 12 is a plan sectional view illustrating a combination of a seal groove and a seal member of the inner shroud.
Figure 13:
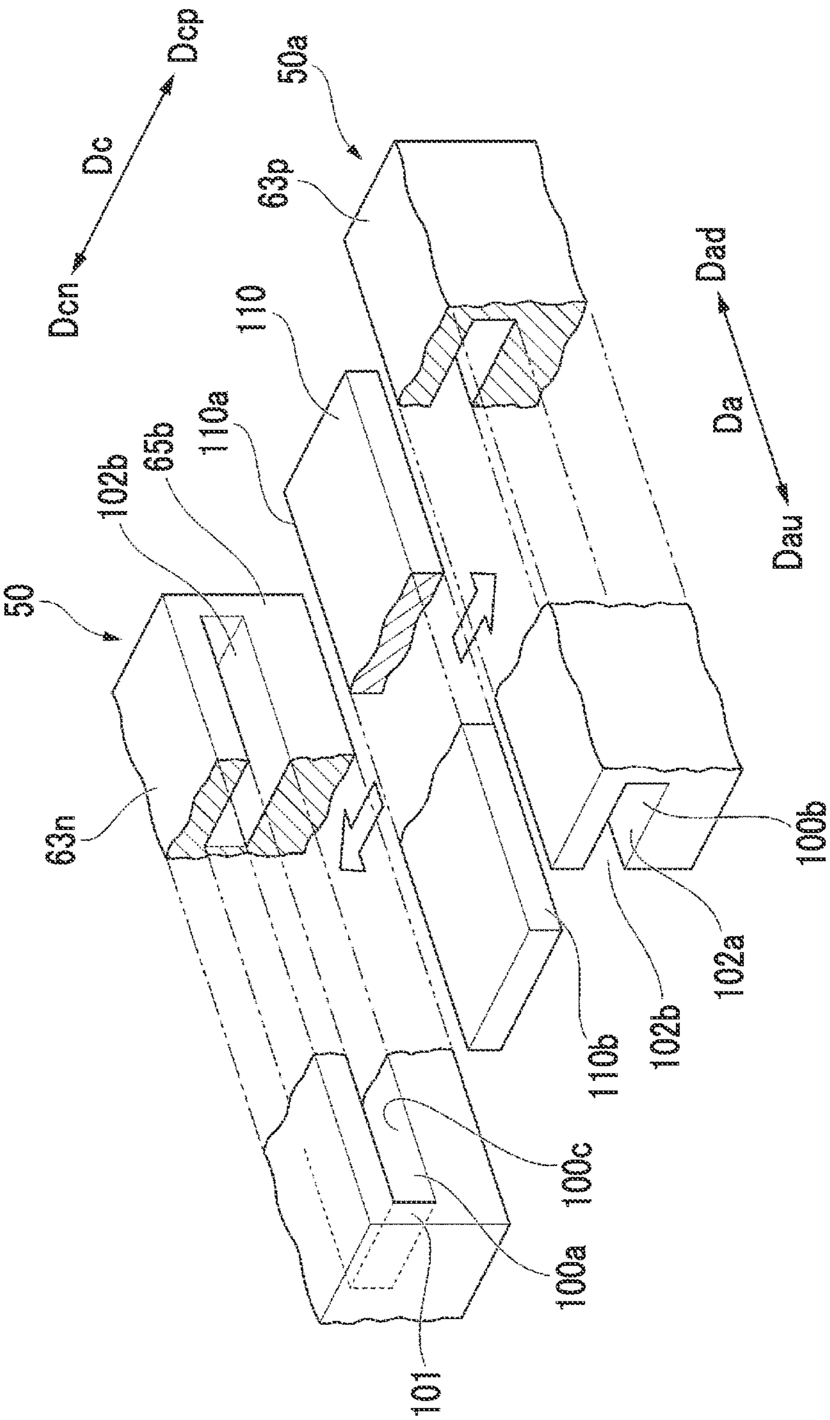
FIG. 13 is a perspective view illustrating a combination of the seal groove and the seal member between a suction-side peripheral wall and an adjacent blade.

FIG. 12 is a plan sectional view illustrating a combination of the seal groove 100 and the seal member 110 of the inner shroud 60*i*. FIG. 13 is a perspective view illustrating a combination of the seal groove and the seal member between the suction-side peripheral wall and the adjacent blade.

FIG. 12 illustrates an example of the inner shroud 60*i* as an example. The seal groove 100 extending to an end portion 70*b* on the downstream side Dad from an end portion 70*a* on the upstream side Dau of the suction-side peripheral wall 63*n* and the pressure-side peripheral wall 63*p* is formed on the outer wall surface 65*b* of the suction-side peripheral wall 63*n* and the pressure-side peripheral wall 63*p* of the inner shroud body 61*i* of the inner shroud 60*i*. The seal groove 100 (suction-side seal groove 100*a*, pressure-side seal groove 100*b*) is recessed to the blade body 51 side in the circumferential direction Dc from the outer wall surface 65*b* of the suction-side peripheral wall 63*n* or the pressure-side peripheral wall 63*p*, and a cross section in the axial direction Da is formed in a rectangular shape. The seal groove 100 is formed at a position facing the seal groove 100 formed in the circumferential direction Dc on the pressure-side peripheral wall 63*p* of an adjacent blade 50*a*, which is the stator blade 50 adjacent in the circumferential direction Dc, or on the outer wall surface 65*b* of the suction side peripheral wall 63*n*. The seal member 110 (to be described later) is inserted into each of the seal grooves 100 (suction-side seal groove 100*a*, pressure-side seal groove 100*b*) formed on both sides facing each other in the circumferential direction Dc.

FIG. 13 is a perspective view illustrating a seal structure in which the seal member 110 and the seal groove 100 are combined with each other. The seal structure illustrated in FIG. 13 is configured to include the suction-side seal groove 100*a* formed on the suction-side peripheral wall 63*n* of the shroud body 61*i* of the inner shroud 60*i*, the pressure-side seal groove 100*b* formed on the pressure-side peripheral wall 63*p* of the adjacent blade 50*a* adjacent to the suction-side peripheral wall 63*n*, and the seal member 110 inserted into both sides of the suction-side seal groove 100*a* and the pressure-side seal groove 100*b*. The end portion 70*a* on the upstream side Dau of the suction-side seal groove 100*a* is closed by a wall portion 101, and the end portion 70*b* on the downstream side Dad is similarly closed by the wall portion 101. Meanwhile in the circumferential direction Dc, the seal structure has an opening 102*b* formed on the outer wall surface 65*b* of the suction side peripheral wall 63*n* and open to the pressure-side peripheral wall 63*p* side. In addition, an opening 102*a* open to the upstream side Dau is formed in the end portion 70*a* on the upstream side Dau of the pressure-side real groove 100*b* formed on the pressure-side peripheral wall 63*p* of the adjacent blade 50*a* formed to face in the circumferential direction Dc, and is not closed by the wall portion 101. Similar to the suction-side seal groove 100*a*, the end portion 70*b* on the downstream side Dad is closed by the wall portion 101 (refer to FIG. 12). Meanwhile, in the circumferential direction Dc, the seal structure has an opening 102*b* formed on the outer wall surface 65*b* (refer to FIG. 12) of the pressure-side peripheral wall 63*p* and open to the suction-side peripheral wall 63*n* side.

The seal member 110 is formed in a flat thin plate shape extending to be longer in the axial direction Da than the width in the circumferential direction Dc. A suction-side end portion 110*a* of the seal member 110 is inserted into the suction-side seal groove 100*a*, and a pressure-side end portion 110*b* of the seal member 110 is inserted into the pressure-side seal groove 100*b*. In a state where the seal member 110 is inserted into the seal groove 100 and the adjacent blade 50*a* is assembled, a slight gap is formed between the seal member 110 and an inner surface 100*c* of the seal groove 100. Here, the reason for maintaining only a slight gap is to reduce the probability that the cooling air may flow to the combustion gas flow path 49 from the gap formed between the seal member 110 and the seal groove 100, and to achieve the reduced amount of the cooling air.

In addition, on the pressure-side peripheral wall 63*p* of the shroud body 61*i* of the inner shroud 60*i* disposed on a side opposite to the above-described suction-side peripheral wall 63*n* in the circumferential direction Dc, a seal structure is formed to include a combination of the pressure-side seal groove 100*b* formed on the outer wall surface 65*b* of the pressure-side peripheral wall 63*p*, the suction-side seal groove 100*a* formed on the suction-side peripheral wall 63*n* of the adjacent blade 50*a* adjacent to the pressure-side peripheral wall 63*p*, and the seal member 110 inserted into both sides of the pressure-side seal groove 100*b* and the suction-side seal groove 100*a*. Even in a case of the seal structure of the pressure-side peripheral wall 63*p*, the same structure as the seal structure of the auction-side peripheral wall 63*n* can be applied. In a case of this seal structure, the opening 102*a* is formed only in the end portion 70*a* on the upstream side Dau of the pressure-side seal groove 100*b*. The end portion 70*b* on the downstream side Dad, and the end portion 70*a* on the upstream side Dau and the end portion 70*b* on the downstream side Dad of the suction-side seal groove 100*a* of the adjacent blade 26*b* are closed by the wall portion 101.

In the above-described seal structure, the opening 102*a* is formed only in the end portion 70*a* on the upstream side Dau of the pressure-side seal groove 100*b* of the adjacent blade 50*a* adjacent to the suction-side peripheral wall 63*n*. The end portion 70*b* on the downstream side Dad, the end portion 70*a* on the upstream side Dau of the pressure-side seal groove 100*b* of the adjacent blade 50*a*, and the end portion 70*b* on the downstream side Dad of the suction-side seal groove 100*a* are closed by the wall portion 101. However, a set of the seal structures configured to include the suction-side seal groove 100*a*, the pressure-side seal groove 100*b*, and the seal member 110 is not limited to the above-described seal structure, as long as only any one location of the end portions 70*a* and 70*b* at four locations such as the end portion 70*a* on the upstream side Dau and the end portion 70*b* on the downstream side Dad of the suction-side seal groove 100*a*, and the end portion 70*a* on the upstream side Dau and the end portion 70*b* on the downstream side Dad of the pressure-side seal groove 100*b* includes the opening 102 in the axial direction, and the other three locations are closed by the wall portions 101.

As described above, in the seal groove 100, the opening 102*a* may be provided in at least one location of the four end portions 20*a* and 70*b* in the axial direction Da of the suction-side seal groove 100*a* and of the pressure-side seal groove 100*b* which form one set of the seal structures. However, the openings 102*a* may be provided in two locations. When the openings 102*a* are provided in two locations, it is not desirable that the openings 102*a* are provided in both side end portions 70*a* on both upstream sides Dau of the suction-side seal groove 100*a* and the pressure-side seal groove 100*b* which are located at the same position in the axial direction Da, or in both side end portions 70*b* on both downstream sides Dad of the pressure-side groove 100*b* and at the end portion 70*b* on both sides of both downstream sides Dad of the pressure-side seal groove 100*b* and the suction-side seal groove 100*a*, in the end portions 70*a* and 70*b* in the axial direction Da of the suction-side seal groove 100*a* and the pressure-side seal groove 100*b*. In a case where the end portions 70*a* and 70*b* which have the openings 102*a* as described above are located at the same position in the axial direction Da, when the stator blade 50 and the adjacent blade 50*a* are assembled, and the suction-side seal groove 100*a* and the pressure-side seal groove 100*b* are joined via the outer wall surface 65*b*, the opening 102*a* formed in the suction-side seal groove 100*a* and the opening 102*a* formed in the pressure-side seal groove 100*b* are adjacent to each other. Consequently, a large opening is formed in the end portions 70*a* and 70*b* on the upstream side Dau or the downstream side Dad. Therefore, there is a possibility that the seal member 110 moves inside the seal groove 100 in the axial direction Da due to vibrations of the gas turbine 10, and the seal member 110 may fall off from an upstream end in the axial direction Da of the seal groove 100.

Therefore, when the two openings 102*a* are provided in one set of the seal structures, a structure may be adopted as follows. The opening 102*a* is provided in any one end portion 70*a* in the axial direction Da of the suction-side seal groove 100*a* and the pressure-side seal groove 100*b*, and the opening 102*a* in the remaining one location is provided in the other end portion 701*b*.

When the above-described seal structure is applied, the seal member 110 can be easily assembled to the seal groove 100 even in a case where the gap between the seal member 110 and the inner wall of the seal groove 100 is small. That is, in the stator blade 50, the adjacent blade 50*a* is temporarily placed in the circumferential direction Dc. The seal member 110 is disposed between the adjacent blades 50*a*, and is assembled in the circumferential direction Dc. However, the gap from the adjacent blade 50*a* in the circumferential direction Dc is small, and the gap between the inner surface 100*c* of the seal groove 100 and the inserted seal member 110 is also small. Therefore, during a process of connecting the stator blade 50 and the adjacent blade 50*a*, it is difficult to set the seal member 110 at an accurate position by inserting the seal member 110 along a shape of the seal groove 100.

However, in a case where the opening 102*a* is formed in the end portions 70*a* and 70*b* in at least one location of the four end portions 70*a* and 70*b* in four locations on the upstream side Dau and the downstream side Dad of the suction-side seal groove 100*a* and the pressure-side seal groove 100*b* which form the above-described set of the seal grooves 100, when the seal member 110 is set, a degree of freedom is added to a movement width and an alignment adjustment width in the seal groove 100 of the seal member 110 inside the seal groove 100, and the seal member 110 is easily assembled to the seal groove 100.

As described above, the shroud 60 (inner shroud 60*i*, outer shroud 60*o*) includes a structure in which the shelf 71 (71*i*, 71*o*) is disposed on the inner wall surface 65*a* of the shroud 60, and the impingement plate 81 is fixed to the shelf 71 by means of welding or the like. Since this structure is provided, a cooling structure for performing impingement cooling on the bottom plate 64 of the shroud 60 is provided, and the shelf 71 is molded integrally with the inner wall surface 65*a* of the shroud 60. Accordingly, the deformation of the shroud 60 can be suppressed by improving the rigidity of the shroud 60. However, when the shelf 71 is formed on the entire periphery of the inner wall surface 65*a* of the shroud 60, the thermal stress of a portion of the peripheral wall 65 of the shroud 60 increases. Therefore, it is desirable to prevent the deformation of the shroud 60 and to reduce the thermal stress by partially providing a region where the shelf 21 is not disposed. Since this structure of the shroud 60 is provided, the deformation of the suction-side peripheral wall 63*n* and the pressure-side peripheral wall 63*p* of the shroud body 61 is suppressed. Therefore, the deformation is suppressed in the suction-side seal groove 100*a* and the pressure-side seal groove 100*b* formed on the suction-side peripheral wall 63*n* and the pressure-side peripheral wall 63*p*, and the seal member 110 can be easily assembled.

Figure 14:
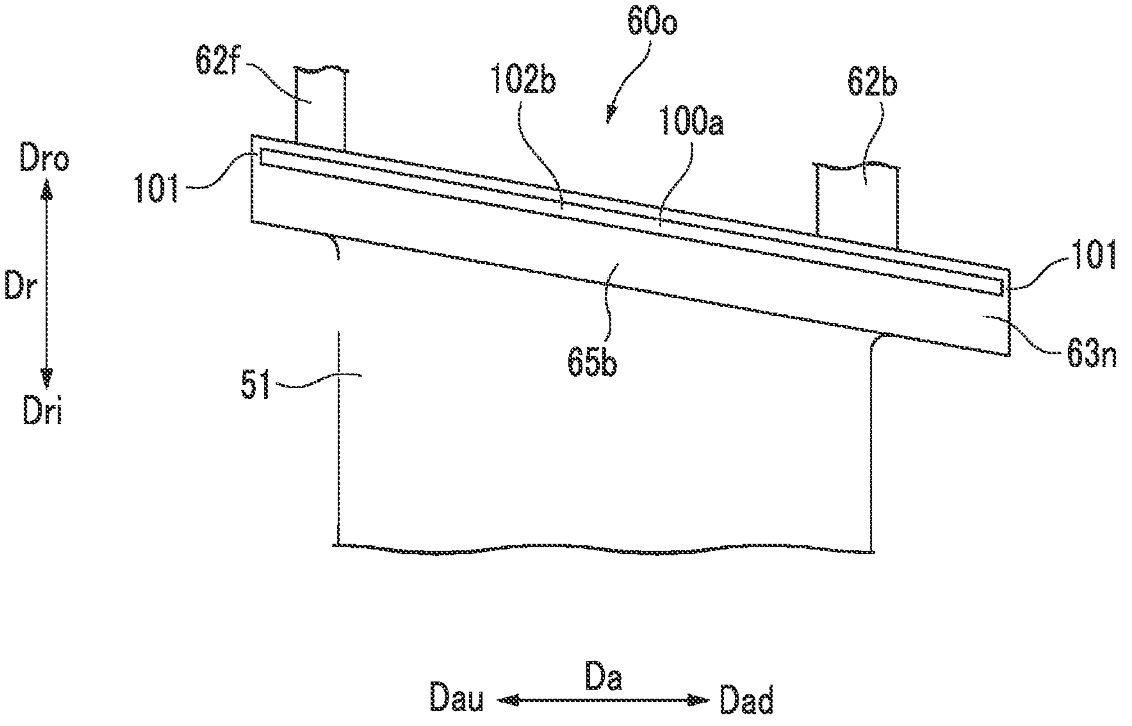
FIG. 14 is a modification example of the seal groove of the outer shroud.

The above-described seal groove 100 indicates a case of the seal groove 100 formed parallel to the gas turbine rotor 11 of the gas turbine 10 (in other words, parallel to the axis Ar). However, as illustrated in FIG. 14, even when the seal groove 100 is inclined (in other words, even when the seal groove 100 is inclined with respect to the axis Ar), the same seal structure can be applied. When the suction-side peripheral wall 63*n* or the pressure-side peripheral wall 63*p* has an inclined shape due to a device connection structure on the upstream side Dau or the downstream side Dad of the stator blade 50, the seal groove 100 has a shape inclined with respect to the axis Ar. The shape inclined with respect to the axis Ar may be either a shape facing the upstream side Dau and inclined outward or inclined inward in a blade height direction (shape inclined in a direction away from the gas pass surface 64*p* in the blade height direction). That is, FIG. 14 illustrates a structure when viewed in a suction-side direction in the circumferential direction Dc of the outer shroud 60*o*. However, the suction-side seal groove 100*a* may have a shape facing the upstream side Dau and inclined outward in the blade height direction. In addition, in a case of the inner shroud 60*i* (not illustrated), the suction-side seal groove 100*a* may have a shape facing the upstream side Dau and inclined inward in the blade height direction Dr. The same applies to a case of the pressure-side seal groove 100*b*.

(Another Embodiment)

Hitherto, the embodiments of the present disclosure have been described in detail with reference to the drawings. However, specific configurations are not limited to the above-described embodiments, and design changes within the scope not departing from the concept of the present disclosure are also included.

For example, in the above-described embodiment, a case where the shelf 71 is provided in the third corner C3 has been described. However, the shelf 71 in the third corner C3 may be omitted.

In the above-described embodiment, a case where the shelves 71 are formed in an L-shape in the first corner C1, the second corner C2, and the third corner C3 when viewed in the radial direction Dr has been described as an example. However, a shape of the shelf 71 is not limited to the Z-shape. For example, a cutout portion may be partially provided in an intermediate portion of the L-shape of the shelf 71 described as an example in the above-described embodiment, and the shelves 71 may be intermittently formed in a rib-less portion 60*n*.

APPENDIX

The stator blade 50 and the gas turbine 10 described in the above-described embodiment are understood as follows, for example.

(1) The stator blade 50 according to a first aspect includes at least the blade body 51 disposed in the combustion gas flow path 49 through which the combustion gas flows, and the shrouds 60*i* and 60*o* that define a portion of the combustion gas flow path 49. The shrouds 60*i* and 60*o* include the gas pass surface 64*p* facing the combustion gas flow path 49, the shroud body 61*i* and 61*o* including at least the bottom plate 64 having the inner surface 64*i* facing the counter-flow path side opposite to the gas pass surface 64*p*, and the impingement plate 81 attached to the shroud bodies 61*i* and 61*o* and having the plurality of through-holes 82*a*. The shroud body 61*i* and 61*o* is formed to include the bottom plate 64, the peripheral walls 65*i* and 65*o* protruding toward the counter-flow path side from the peripheral edge of the inner surface 64*i* of the shroud bodies 61*i* and 61*o*, the shelf 71 formed along the inner wall surface 65*a* of the peripheral walls 65*i* and 65*o*, protruding to the counter-flow path side from the inner surface 64*i* of the bottom plate 64, and supporting the impingement plate 81, and at least one or more partition ribs 60*r* protruding to the counter-flow path side from the bottom plate 64, and joining the blade body 51 and the peripheral walls 65*i* and 65*o* on which the shelf 71 is not formed. The impingement plate 81 forms the cavity 67 which is a space between the inner surface 64*i* of the bottom plate 64 and the inner wall surface 65*a* of the peripheral walls 65*i* and 65*o*.

Examples of the shrouds 60*i* and 60*o* include the inner shroud 60*i* and the outer shroud 60*o*. Examples of the shroud bodies 61*i* and 61*o* include the inner shroud body 61*i* and the outer shroud body 61*o*. Examples of the counter-flow path side include the radial inner side Dri in a case of the inner shroud 60*i* and the radial outer side Dro in a case of the outer shroud 600.

In the stator blade 50, the shelf 71 is not provided in the portion where the partition rib 60*r* is joined to the peripheral walls 65*i* and 65*o* in the shrouds 60*i* and 60*o*. The partition rib 60*r* is directly joined to the inner wall surface 65*a* of the peripheral walls 65*i* and 65*o*. Therefore, the rigidity of the shrouds 60*i* and 60*o* can be reduced.

Therefore, it is possible to suppress the thermal stress generation in the portion where the partition rib 60*r* reaches the peripheral walls 65*i* and 65*o*.

(2) In the stator blade 50 according to a second aspect which is the stator blade 50 of (1), the blade body 51 includes the leading edge portion 52 located on the upstream side Dau of the combustion gas flow in the combustion gas flow path 49, the trailing edge portion 53 located on the downstream side Dad of the combustion gas flow, and the pressure-side surface 55 and the suction-side surface 54 which connect the leading edge portion 52 and the trailing edge portion 53 and face sides opposite to each other. The shelf 71 is formed along the inner wall surface 65*a* of the peripheral walls 65*i* and 65*o*. The peripheral walls 65*i* and 65*o* are formed to include the front peripheral wall 62*f* facing the upstream side Dau and located on the upstream side Dau of the blade body 51, the rear peripheral wall 62*n* facing the downstream side Dad and located on the downstream side Dad of the blade body 51, the pressure-side peripheral wall 63*p* connecting the front peripheral wall 62*f* and the rear peripheral wall 62*b* and located on the side close to the pressure-side surface 55, and the suction-side peripheral wall 63*n* connecting the front peripheral wall 62*f* and the rear peripheral wall 62*b* and located on the side close to the suction-side surface 54. The shelf 71 is formed to include the first corner C1 formed by the inner wall surface 65*a* of the suction-side peripheral wall 63*n* and by the inner wall surface 65*a* of the front peripheral wall 62*f*, the second corner C2 formed by the inner wall surface 65*a* of the pressure-side peripheral wall 63*p* and by the inner wall surface 65*a* of the front peripheral wall 62*f*, and the third corner C3 formed by the inner wall surface 65*a* of the suction-side peripheral wall 53*n* and by the inner wall surface 65*a* of the rear peripheral wall 62*b*.

In the stator blade 50, in the shrouds 60*i* and 60*o*, the first corner C1 and the second corner C2 on the leading edge portion 52 side at the position away from the fitting portion 69*a* between the hook 69 and the thermal barrier ring 45*c* in the axial direction Da are less affected by the thermal stress generated in the fitting portion 69*a*. Therefore, the rigidity around the first corner C1 and the second corner C2 can be increased by disposing the shelf 71. In addition, the third corner C3 close to the trailing edge portion 53 is a corner on the suction-side away from the blade body 51 and the second partition rib 60*rb*, and is less affected by the thermal stress than the fourth corner C4. Therefore, the rigidity of the shrouds 60*i* and 60*o* can be further increased by providing the shelf 71 in the third corner C3. Therefore, it is possible to suppress the strain of the shrouds 60*i* and 600 due to the thermal deformation.

(3) In the stator blade 50 according to a third aspect which is the stator blade 50 of (2), the shroud bodies 61*i* and 61*o* include at least one of the first partition rib 60*rf* which is the partition rib joining the peripheral walls 65*i* and 65*o* and the blade body end portion on the leading edge side of the blade body 51, and the second partition rib 60*rb* which is the partition rib joining the peripheral walls 65*i* and 65*o* and the blade body end portion on the trailing edge side of the blade body 51. In the first partition rib 60*rf*, the first rib cooling hole 92*fa* having one end open to the inner wall surface of the first partition rib 60*rf*, and the other end open to the gas pass surface 64*p* of the bottom plate 64, and penetrating the first partition rib 60*rf* is formed. In the second partition rib 60*rb*, the second rib cooling hole 92*ba* having one end open to the inner wall surface of the second partition rib 60*rb*, and the other end open to the gas pass surface 64*p* or the bottom plate 64, and penetrating the second partition rib 60*rb* is formed.

In the stator blade 50, the first partition rib 60*rf* and the second partition rib 60*rb* receive the thermal stress due to the thermal elongation difference between the blade body 51 and the front peripheral wall 62*f* and the rear peripheral wall 62*b*. However, since the first partition rib 60*rf* and the second partition rib 60*rb* are cooled by the first rib cooling hole 92*fa* and the second rib cooling hole 92*ba*, the thermal stress is reduced.

(4) In the stator blade 50 according to a fourth aspect which is the stator blade 50 of (2) or (3), the impingement plate 81 includes the main body portion 82 extending parallel to the inner surface 64*i* of the shroud bodies 61*i* and 61*o*, the strain absorber 83 including the bent portions 83*a* and 83*b* in both ends, and extending in the radial direction with the predetermined inclination with respect to the main body portion 82 while one end is connected to the main body portion 82, and the fixing portion 84 connected to the bent portion 83*b* formed in the other end of the strain absorber 83. The fixing portion 84 is fixed to any one of the surface 65*fa* facing the counter-flow path side on the peripheral walls 65*i* and 65*o*, the support surface 72 facing the counter-flow path side in the shelf 21, and the region where the shelf 71 is not provided on the inner wall surfaces 65*a* of the peripheral walls 65*i* and 65*o*.

In the stator blade 50, when the impingement plate 81 in welded to the shrouds 60*i* and 60*o*, even if the impingement plate 81 is thermally elongated due to the heat input by welding, this thermal elongation can be absorbed by the elastic deformation of the strain absorber 83. Therefore, it is possible to reduce the probability that the strain caused by the welding may be generated in the main body portion 82 of the impingement plate 81.

(5) In the stator blade 50 according to a fifth aspect which is the stator blade 50 according to any one of (2) to (4), the shroud bodies 61*i* and 610 include the plurality of trailing edge purge cooling holes 91 open to the inner surface 64*i* on the side closer to the rear peripheral wall 62*b* than the blade body 51 and extending toward at least the downstream side Dad from the inner surface 64*i* side. The plurality of trailing edge purge cooling holes 91 are disposed side by side along the circumferential direction of the rear peripheral wall 62*b*, having one end open to the cavity 67 and the other end open to the discharge opening formed on the gas pass surface 64*p*. The rear peripheral wall 62*b* where the trailing edge purge cooling hole 91 is disposed include the region where the shelf 71 is not formed.

In the stator blade 50, the temperature rise of the rear peripheral wall 62*b* in the range where the trailing edge purge cooling hole 91 is disposed is suppressed by the cooling air passing through the trailing edge purge cooling hole 91. Therefore, since the rear peripheral wall 62*b* in the range includes the region where the shelf 71 is not formed, the thermal stress in the region where the temperature rise is suppressed can be reduced.

(6) In the stator blade 50 according to a sixth aspect which is the stator blade 50 of (5), the second partition rib 60*rb* is disposed in the region where the shelf 71 is not formed on the rear peripheral wall 62*b* in which the trailing edge purge cooling hole 91 is disposed.

In the stator blade 50, the second partition rib 60*rb* in Joined to the region of the rear peripheral wall 62*b* where the trailing edge purge cooling hole 91 is disposed and the shelf 71 is not formed. Therefore, the thermal stress around the joining portion between the second partition rib 60*rb* and the rear peripheral wall 62*b* is reduced.

(7) In the stator blade 50 according to a seventh aspect which is the stator blade 50 of (6), the shroud bodies 61*i* and 61*o* are inner shroud bodies 61*i* disposed on the radial inner side Dri of the blade body 51. The shelf 71 is formed to further include the fourth corner C4 formed by the inner wall surface 65*a* of the pressure-side peripheral wall 63*p* and by the inner wall surface 65*a* of the rear peripheral wall 62*b*.

In the stator blade 50, the rigidity of the inner shroud body 61*i* in the fourth corner C4 can be improved.

(8) In the stator blade 50 according to an eighth aspect which is the stator blade 50 of (7), the shelf 71 is formed to include the intermediate shelf 71*im* disposed between the shelf 71*ic* formed to extend along the inner wall surface 65*a* of the rear peripheral wall 62*b* and to include the third corner C3, and the shelf 71*id* is formed to extend along the inner wall surface 65*a* of the rear peripheral wall 62*b* and to include the fourth corner C4, formed along the inner wall surface 65*a* of the rear peripheral wall 62*b*, protruding to the counter-flow path side from the inner surface 64*i* of the bottom plate 64, and supporting the impingement plate 81. The intermediate shelf 71*im* is interposed from both sides in the circumferential direction Dc by the region where the shelf 71 is not formed. The second partition rib 60*rb* is disposed between the fourth corner C4 and the intermediate shelf 71*im*. In the stator blade 50, the impingement plate 81 can be supported by the intermediate shelf 71*im* between the third corner C3 and the fourth corner C4 of the inner shroud body 61*i*, and the proper height of the impingement plate 81 can be maintained.

(9) in the stator blade 50 according to a ninth aspect which the stator blade 50 of (8), the trailing edge purge cooling hole 91 includes the plurality of first purge cooling holes 91*i* disposed between the intermediate shelf 71*im* and the fourth corner C4 of the inner shroud body 61*i* while the second partition rib 60*rb* is interposed therebetween.

In the stator blade 50, the region where the shelf 71 is not formed is provided in the region between the intermediate shelf 71*im* of the rear peripheral wall 62*b* and the fourth corner C4 so that the rigidity of the region is reduced and the cooling effect of the first purge cooling hole 91*i* is achieved. In this manner, the thermal stress of the rear peripheral wall 62*b* between the intermediate shelf 71*im* and the fourth corner C4 can be reduced. In addition, since the intermediate shelf 71*im* is disposed, the impingement plate 81 disposed between the third corner C3 and the second partition rib 60*rb* can be maintained at a proper height.

(10) In the stator blade 50 according to a tenth aspect which is the stator blade 50 of (5) or (6), the shroud body 61 includes the outer shroud body 61*o* disposed on the radial outer side Dro of the blade body 51. The trailing edge purge cooling hole 91 includes the plurality of second purge cooling holes 91*o* disposed between the third corner C3 of the outer shroud body 61*o* and the fourth corner C4 of the outer shroud body 61*c* formed by the inner wall surface 65*a* of the pressure-side peripheral wall 63*p* and by the inner wall surface 65*a* of the rear peripheral wall 62*b*.

In the stator blade 50, the temperature rise of the rear peripheral wall 62*b* can be suppressed by the second purge cooling hole 91*o* between the third corner C3 and the fourth corner C4. Therefore, it is possible to suppress the thermal stress generation in the region where the temperature rise of the rear peripheral wall 62*b* is suppressed.

(11) In the stator blade 50 according to an eleventh aspect which is the stator blade 50 according to any one of (5) to (10), the shroud bodies 61*i* and 61*o* include the cavity 67 surrounded by peripheral walls 65*i* and 65*o* and having the recessed portion recessed toward the gas pass surface 64*p* side from the counter-flow path side in the radial direction Dr, the trailing edge circumferential passage 79 formed on the rear peripheral wall 62*b* and extending in the circumferential direction Dc, the suction-side passage 78*n* formed on the suction-side peripheral wall 53*n*, having one end open to the cavity 67 and the other end connected to one end portion of the trailing edge circumferential passage 79, the pressure-side passage 78*p* formed on the pressure-side peripheral wall 63*p*, having one end open to the cavity 67 and the other end connected to the other end portion of the trailing edge circumferential passage 79, and the trailing edge end portion passage 80 formed in the circumferential direction Dc of the rear peripheral wall 62*b*, having one end connected to the trailing edge circumferential passage 79 and the other end open to the rear end surface on the downstream side Dad of the rear peripheral wall 62*b*, and the discharge opening 91*ia* of the trailing edge purge cooling hole 91 is formed on the downstream side Dad from the passage center line of the trailing edge circumferential passage 79 extending in the circumferential direction Dc.

In the stator blade 50, the position of the discharge opening 91*ia* of the trailing edge purge cooling hole 91 is disposed on the downstream side Dad from the trailing edge circumferential passage 79. Therefore, the gas pass surface 64*p* side of the region between the inner wall surface 65*a* of the rear peripheral wall 62*b* and the trailing edge circumferential passage 79 which is the leading edge portion 53 side from the trailing edge circumferential passage 79 is cooled by the trailing edge purge cooling hole 91, and the thermal stress of the rear peripheral wall 62*b* is further reduced.

(12) In the stator blade 50 according to a twelfth aspect which is the stator blade 50 according to any one of (2) to (11), the pressure-side peripheral wall 63*p* or the suction-side peripheral wall 63*n* includes the groove 100 formed on the outer wall surface 65*b* directed in the circumferential direction, extending to the downstream side from the upstream side in the axial direction, and configured to accommodate the plate-shaped seal member 110.

In the stator blade, the shroud includes the groove 100 configured to accommodate the seal member 110 on the pressure-side peripheral wall 63*p* or the suction-side peripheral wall 63*n*. Therefore, a loss of the cooling air flowing into the combustion gas flow path 49 is suppressed.

(13) In the stator blade 50 according to a thirteenth aspect which is the stator blade 50 of (12), the groove 100 is recessed to a blade body side in the circumferential direction from the outer wall surface 65*b*, and is formed in a rectangular shape when viewed in the axial direction.

At least one end portion among the end portion 70*a* on the upstream side in the axial direction of the suction-side peripheral wall 63*n*, the end portion 70*b* on the downstream side in the axial direction of the suction-side peripheral wall 63*n*, the end portion 70*a* on the upstream side in the axial direction of the pressure-side peripheral wall 63*p*, and the end portion 70*b* on the downstream side in the axial direction of the pressure-side peripheral wall 63*p* includes the opening 102*a* which is open in the axial direction, and the other end portions 70*a* and 70*b* which do not include the opening 102*a* include the wall portion 101 that closes the groove 100 in the axial direction.

In the stator blade, at least one of the end portions 70*a* and 70*b* on the upstream side or the downstream side in the axial direction of the suction-side peripheral wall 63*n* or the pressure-side peripheral wall 63*p* includes the opening 102*a* which is not closed by the wall portion 101. Therefore, the seal member 110 can be easily assembled to the groove 130.

(14) In the stator blade 50 according to a fourteenth aspect which is the stator blade 50 of (12) or (13), the groove 100 is recessed to a blade body side in the circumferential direction from the outer wall surface 65*b*, is formed in a rectangular shape when viewed in the axial direction, and is disposed to face the groove 100 formed on the outer wall surface 65*b* of the adjacent blade 50*a* disposed to be adjacent in the circumferential direction. At least one end portion among the end portion 70*a* on the upstream side in the axial direction of the pressure-side peripheral wall 63*p*, the end portion 70*b* on the downstream side in the axial direction of the pressure-side peripheral wall 63*p*, the end portion 70*a* on the upstream side in the axial direction of the suction-side peripheral wall 63*n* of the adjacent blade 50*a* adjacent to the pressure-side peripheral wall 63*p*, and the end portion 20*b* on the downstream side in the axial direction of the suction-side peripheral wall 63*n* of the adjacent blade 50*a*, and at least one end portion among the end portion on the upstream side in the axial direction of the suction-side peripheral wall 63*n*, the end portion on the downstream side in the axial direction of the suction-side peripheral wall 63*n*, the end portion 70*a* on the upstream side in the axial direction of the pressure-side peripheral wall 63*p* of the adjacent blade adjacent to the suction-side peripheral wall 63*n*, and the end portion 70*b* on the downstream side in the axial direction of the pressure-side peripheral wall 63*p* of the adjacent blade 50*a* adjacent to the suction-side peripheral wall 63*n* include the opening 102*a* which is open in the axial direction, and the other end portions 70*a* and 70*b* which do not include the opening 102*a* include the wall portion 101 that closes the groove 100 in the axial direction.

(15) In the stator blade 50 according to a fifteenth aspect which is the stator blade 50 of (12) to (14), the groove 100 is directed toward the downstream side from the upstream side in the axial direction, and is inclined to the counter-flow path side in the blade height direction.

(16) The stator blade 50 according to a sixteenth aspect which is the stator blade 50 according to any one of (5) to (10) includes at least the blade body 51 disposed in the combustion gas flow path 49 through which the combustion gas flows, and the shrouds 60*i* and 60*o* that define a portion of the combustion gas flow path 49. The shrouds 60*i* and 60*o* include the shroud bodies 61*i* and 61*o* including at least the bottom plate 64 having the gas pass surface 64*p* facing the combustion gas flow path 49 and the inner surface 64*i* facing the counter-flow path side opposite to the gas pass surface 64*p*, and the impingement plate 81 attached to the shrouds 60*i* and 60*o* and having the plurality of through-holes 82*a*. The shroud bodies 61*i* and 61*o* include the bottom plate 64, the peripheral walls 65*i* and 65*o* protruding to the counter-flow path side from the peripheral edge of the inner surface 64*i* of the shroud bodies 61*i* and 61*o*, and the shelf 71 formed to protrude to the counter-flow path side from the inner surfaces 64*i* along only a portion of the inner wall surface 65*a* of the peripheral walls 65*i* and 65*o*, and Supporting the impingement plate 81. The impingement plate 81 includes the main body portion 82 extending parallel to the inner wall surface 65*a* of the shroud bodies 61*i* and 61*o*, and the bent portions 83*a* and 83*b* in both ends, and includes the strain absorber 83, having one end connected to the main body portion 82, having a predetermined inclination with respect to the main body portion 82, and extending in the radial direction, and the fixing portion 84 connected to the bent portion 83*b* formed in the other end of the strain absorber 83. The fixing portion 84 is fixed to any one of the surface 65*fa* facing the counter-flow path side on the peripheral walls 65*i* and 65*o*, the support surface 72 facing the counter-flow path side in the shelf 71, and the region where the shelf 71 is not provided on the inner wall surface 65*a* of the peripheral walls 65*i* and 65*o*.

In the stator blade 50, when the impingement plate 81 is welded to the shrouds 60*i* and 60*o*, even in a case where the impingement plate 81 is thermally elongated due to the heat input by welding, the thermal elongation can be absorbed by the elastic deformation of the strain absorber 62. Therefore, it is possible to reduce the probability that the strain caused by the welding may be generated in the main body portion 82 of the impingement plate 81.

(17) The gas turbine 10 includes the stator blade 50 according to any one of (1) to (16), the rotor 11 rotatable by the combustion gas, and the casing 15. The stator blade 50 is disposed inside the casing 15, and is fixed to the casing 15.

In the gas turbine 10, the reliability can be improved by suppressing the thermal deformation and the thermal stress generation of the stator blade 50.

INDUSTRIAL APPLICABILITY

According to the present disclosure, it is possible to provide the stator blade and the gas turbine which can suppress the thermal stress generation.

REFERENCE SIGNS LIST

- 10: gas turbine
- 11: gas turbine rotor (rotor)
- 14: intermediate casing
- 15: casing
- 15: gas turbine casing (casing)
- 20: compressor
- 21: compressor rotor
- 22: rotor shaft
- 23: rotor blade row
- 23*a*: rotor blade
- 25: compressor casing
- 26: stator blade row
- 26*a*: stator blade
- 30: combustor
- 40: turbine
- 41: turbine rotor
- 42: rotor shaft
- 43: rotor blade row
- 43*a*: rotor blade
- 43*p*: platform

43*r*: blade root
45: turbine casing
45*a*: outer casing
45*b*: inner casing
45*c*: thermal barrier ring
45*p*: cooling air passage
46: stator blade row
49: combustion gas flow path
50: stator blade
50*a*: adjacent blade
51: blade body
51*r*: blade body end portion
52: leading edge portion
53: trailing edge portion
54: suction-side surface
55: pressure-side surface
56: fillet portion
60*i*: inner shroud
60*o*: outer shroud
60*r*: partition rib
60*rf*: first partition rib
60*rb*: second partition rib
61*i*: inner shroud body (shroud body)
61*o*: outer shroud body (shroud body)
62*b*: rear peripheral wall
62*f*: front peripheral wall
63: circumferential end portion
63*n*: suction-side peripheral wall
63*p*: pressure side peripheral wall
64: bottom plate
64*i*: inner surface (counter-flow path surface)
64*p*: gas pass surface
65*a*: inner wall surface
65*b*: outer wall surface
65*fa*: surface
65*i*, 65*o*: peripheral wall
65*t*: end portion
66: recessed portion
67: cavity
69: hook
69*a*: fitting portion
71, 71*i*, 71*o*: shelf
71*im*: intermediate shelf
72: support surface
75: blade air passage
77: blade surface ejection passage
81: impingement plate
81*a*: first edge
81*b*: second edge
81*c*: third edge
81W: welding portion
82: main body portion
82*a*, 82*b*: through-hole
83: strain absorber
64: fixing portion
90: split ring
91: trailing edge purge cooling hole
100: seal groove (groove)
110: seal member

The invention claimed is:

1. A stator blade comprising at least:

a blade body disposed in a combustion gas flow path through which a combustion gas flows; and a shroud that defines a part of the combustion gas flow path, wherein the shroud includes a shroud body including at least a bottom plate having a gas pass surface facing the combustion gas flow path, an inner surface facing a counter-flow path side opposite to the gas pass surface, and an impingement plate attached to the shroud body and having a plurality of through-holes, wherein the shroud body is formed to include the bottom plate, a peripheral wall protruding toward the counter-flow path side from a peripheral edge of the inner surface of the shroud body, a shelf formed along an inner wall surface of the peripheral wall, protruding to the counter-flow path side from the inner surface of the bottom plate, and supporting the impingement plate, and one or more partition ribs protruding to the counter-flow path side from the bottom plate, and joining the blade body and the peripheral wall on which the shelf is not formed, wherein the impingement plate forms a cavity which is a space between the inner surface of the bottom plate and the inner wall surface of the peripheral wall, and wherein in one of the one or more partition ribs, a rib cooling hole having one end open to an inner wall surface of the one of the one or more partition ribs, and the other end open to the gas pass surface of the bottom plate, and penetrating the one of the one or more partition ribs is formed.

2. The stator blade according to claim 1, wherein the blade body includes a leading edge portion located on an upstream side of a combustion gas flow in the combustion gas flow path, a trailing edge portion located on a downstream side of the combustion gas flow, and a pressure-side surface and a suction-side surface which connect the leading edge portion and the trailing edge portion and face sides opposite to each other, wherein the shelf is formed along the inner wall surface of the peripheral wall, wherein the peripheral wall is formed to include a front peripheral wall facing the upstream side and located on the upstream side of the blade body, a rear peripheral wall facing the downstream side and located on the downstream side of the blade body, a pressure-side peripheral wall connecting the front peripheral wall and the rear peripheral wall and located on a side close to the pressure-side surface, and a suction-side peripheral wall connecting the front peripheral wall and the rear peripheral wall and located on a side close to the suction-side surface, wherein the shelf is formed to include a first corner formed by an inner wall surface of the suction-side peripheral wall and by an inner wall surface of the front peripheral wall, a second corner formed by an inner wall surface of the pressure-side peripheral wall and by the inner wall surface of the front peripheral wall, and a third corner formed by the inner wall surface of the suction-side peripheral wall and by an inner wall surface of the rear peripheral wall.

3. The stator blade according claim 2,
wherein the one or more partition ribs of the shroud body includes include at least one of a first partition rib which is a partition rib joining the peripheral wall and a blade body end portion on a leading edge side of the blade body, and
a second partition rib which is a partition rib joining the peripheral wall and a blade body end portion on a trailing edge side of the blade body.

4. The stator blade according to claim 2,
wherein the impingement plate includes
a main body portion extending parallel to the inner surface of the shroud body,
a strain absorber including bent portions in both ends, and extending in a radial direction with a predetermined inclination with respect to the main body portion while one end is connected to the main body portion, and
a fixing portion connected to the bent portion formed in the other end of the strain absorber,
wherein the fixing portion is fixed to any one of a surface facing the counter-flow path side on the peripheral wall, a support surface facing the counter-flow path side in the shelf, and a region where the shelf is not provided on the inner wall surface of the peripheral wall.

5. The stator blade according to claim 2,
wherein the shroud body includes a plurality of trailing edge purge cooling holes open to the inner surface on a side closer to the rear peripheral wall than the blade body and extending toward at least the downstream side from the counter-flow path side,
the plurality of trailing edge purge cooling holes are disposed side by side along a circumferential direction of the rear peripheral wall, and have one end open to the cavity and the other end open to a discharge opening formed on the gas pass surface, and
the rear peripheral wall where the trailing edge purge cooling hole is disposed includes a region where the shelf is not formed.

6. The stator blade according to claim 5,
wherein the one of the one or more partition ribs is disposed in the region where the shelf is not formed on the rear peripheral wall in which the trailing edge purge cooling hole is disposed.

7. The stator blade according to claim 6,
wherein the shroud body is an inner shroud body disposed inside the blade body in a radial direction, and
the shelf is formed to further include a fourth corner formed by the inner wall surface of the pressure-side peripheral wall and by the inner wall surface of the rear peripheral wall.

8. The stator blade according to claim 7,
wherein the shelf is formed to include an intermediate shelf disposed between the shelf formed to extend along the inner wall surface of the rear peripheral wall and to include the third corner, and the shelf is formed to extend along the inner wall surface of the rear peripheral wall and to include the fourth corner, formed along the inner wall surface of the rear peripheral wall, protruding to the counter-flow path side from the inner surface of the bottom plate, and supporting the impingement plate,
the intermediate shelf is interposed from both sides in the circumferential direction by the region where the shelf is not formed, and
the one of the one or more partition ribs is disposed between the fourth corner and the intermediate shelf.

9. The stator blade according to claim 8,
wherein the trailing edge purge cooling hole includes a plurality of first purge cooling holes disposed between the intermediate shelf and the fourth corner of the inner shroud body while the one of the one or more partition ribs is interposed therebetween.

10. The stator blade according to claim 5,
wherein the shroud body includes an outer shroud body disposed outside the blade body in a radial direction, and
the trailing edge purge cooling hole includes a plurality of second purge cooling holes disposed between the third corner of the outer shroud body and a fourth corner of the outer shroud body formed by the inner wall surface of the pressure-side peripheral wall and by the inner wall surface of the rear peripheral wall.

11. The stator blade according to claim 5,
wherein the shroud body includes
a cavity surrounded by the peripheral wall and having a recessed portion recessed toward a gas pass surface side from the counter-flow path side in a radial direction,
a trailing edge circumferential passage formed on the rear peripheral wall and extending in the circumferential direction,
a suction-side passage formed on the suction-side peripheral wall, and having one end open to the cavity and the other end connected to one end portion of the trailing edge circumferential passage,
a pressure-side passage formed on the pressure-side peripheral wall, and having one end open to the cavity and the other end connected to the other end portion of the trailing edge circumferential passage, and
a trailing edge end portion passage formed in the circumferential direction of the rear peripheral wall, and having one end connected to the trailing edge circumferential passage and the other end open to a rear end surface on the downstream side in an axial direction of the rear peripheral wall,
wherein the discharge opening of the trailing edge purge cooling hole is formed on the downstream side in the axial direction from a passage center line of the trailing edge circumferential passage extending in the circumferential direction.

12. The stator blade according to claim 2,
wherein the pressure-side peripheral wall or the suction-side peripheral wall includes a groove formed on an outer wall surface directed in a circumferential direction, extending to the downstream side from the upstream side in an axial direction, and configured to accommodate a seal member.

13. The stator blade according to claim 12,
wherein the groove is recessed to a blade body side in the circumferential direction from the outer wall surface, and is formed in a rectangular shape when viewed in the axial direction,
at least one end portion among an end portion on the upstream side in the axial direction of the suction-side peripheral wall, an end portion on the downstream side in the axial direction of the suction-side peripheral wall, an end portion on the upstream side in the axial direction of the pressure-side peripheral wall, and an end portion on the downstream side in the axial direction of the pressure-side peripheral wall includes an opening which is open in the axial direction, and the other end portion which does not include the opening includes a wall portion that closes the groove in the axial direction.

14. The stator blade according to claim 12, wherein the groove is recessed to a blade body side in the circumferential direction from the outer wall surface, is formed in a rectangular shape when viewed in the axial direction, and is disposed to face the groove formed on the outer wall surface of an adjacent blade disposed to be adjacent in the circumferential direction, at least one end portion among an end portion on the upstream side in the axial direction of the pressure-side peripheral wall, an end portion on the downstream side in the axial direction of the pressure-side peripheral wall, an end portion on the upstream side in the axial direction of the suction-side peripheral wall of the adjacent blade adjacent to the pressure-side peripheral wall, and an end portion on the downstream side in the axial direction of the suction-side peripheral wall of the adjacent blade, and at least one end portion among an end portion on the upstream side in the axial direction of the suction-side peripheral wall, an end portion on the downstream side in the axial direction of the suction-side peripheral wall, an end portion on the upstream side in the axial direction of the pressure-side peripheral wall of the adjacent blade adjacent to the suction-side peripheral wall, and an end portion on the downstream side in the axial direction of the pressure-side peripheral wall of the adjacent blade adjacent to the suction-side peripheral wall include an opening which is open in the axial direction, and the other end portion which does not include the opening includes a wall portion that closes the groove in the axial direction.

15. The stator blade according to claim 12, wherein the groove is directed toward the downstream side from the upstream side in the axial direction, and is inclined to the counter-flow path side in a blade height direction.

16. A gas turbine comprising:

the stator blade according to claim 1;

a rotor rotatable by the combustion gas; and a casing that covers the rotor, wherein the stator blade is disposed inside the casing, and is fixed to the casing.

* * * * *